(12) United States Patent
Ahlstrom

(10) Patent No.: US 11,420,724 B2
(45) Date of Patent: Aug. 23, 2022

(54) WHEEL WELL FAIRING FOR AN AIRCRAFT

(71) Applicant: AERO DESIGN LABS, INC., Ft. Worth, TX (US)

(72) Inventor: Eric A. Ahlstrom, South Willard, UT (US)

(73) Assignee: AERO DESIGN LABS, INC., Fort Worth, TX (US)

( * ) Notice: Subject to any disclaimer, the term of this patent is extended or adjusted under 35 U.S.C. 154(b) by 126 days.

(21) Appl. No.: 16/981,971

(22) PCT Filed: Mar. 21, 2019

(86) PCT No.: PCT/US2019/023332
§ 371 (c)(1),
(2) Date: Sep. 17, 2020

(87) PCT Pub. No.: WO2019/183328
PCT Pub. Date: Sep. 26, 2019

(65) Prior Publication Data
US 2020/0407042 A1   Dec. 31, 2020

Related U.S. Application Data

(60) Provisional application No. 62/647,242, filed on Mar. 23, 2018.

(51) Int. Cl.
*B64C 7/00* (2006.01)
*B64C 25/00* (2006.01)
(Continued)

(52) U.S. Cl.
CPC .............. *B64C 7/00* (2013.01); *B64C 25/001* (2013.01); *B64C 1/00* (2013.01); *B64C 25/16* (2013.01); *B64C 2025/003* (2013.01)

(58) Field of Classification Search
CPC ........... B64C 7/00; B64C 25/001; B64C 1/00; B64C 25/16; B64C 2025/003; B64C 2230/14
See application file for complete search history.

(56) References Cited

U.S. PATENT DOCUMENTS

| | | | |
|---|---|---|---|
| 4,447,028 A * | 5/1984 | Wang | B64C 9/00 244/215 |
| 5,209,434 A | 5/1993 | Lo Presti et al. | |

(Continued)

OTHER PUBLICATIONS

International Search Report and Written Opinion for PCT/US2019/023332, dated May 20, 2010.

(Continued)

*Primary Examiner* — Rodney A Bonnette
(74) *Attorney, Agent, or Firm* — Abelman, Frayne & Schwab

(57) ABSTRACT

A wheel well fairing for reducing drag on an aircraft fuselage configured with an open wheel well for stowing landing gear of the aircraft. The wheel well fairing includes a Coanda fairing having a convex-shaped lower portion and an upper portion. The upper portion is configured for positioning adjacent an interior vertically-orientated sidewall of the wheel well, and the convex-shaped lower portion has a bottom surface configured to extend substantially parallel to and positioned adjacent with an outer hull surface of the fuselage. The convex-shaped lower portion is curved inwardly within the wheel well between the upper portion and bottom surface. The Coanda fairing is positioned at an aft portion of the wheel well to redirect airflow out of the wheel well in a rearward direction along the bottom hull surface of the fuselage.

27 Claims, 21 Drawing Sheets

(51) Int. Cl.
*B64C 1/00* (2006.01)
*B64C 25/16* (2006.01)

(56) References Cited

U.S. PATENT DOCUMENTS

| | | |
|---|---|---|
| 2015/0001342 A1 | 1/2015 | Takenaka et al. |
| 2016/0214720 A1* | 7/2016 | Hara .................... B64C 25/001 |
| 2019/0039722 A1* | 2/2019 | Adamson .............. B64C 25/001 |

OTHER PUBLICATIONS

"Photos: Boeing 737-8K2 Aircraft Pictures: Airliners.net"; www.airliners.net, retrieved Jun. 3, 2016, whole document.

* cited by examiner

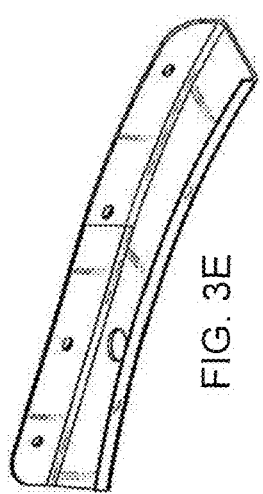
FIG. 3A
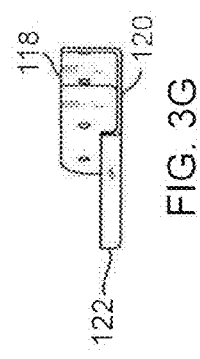
FIG. 3B
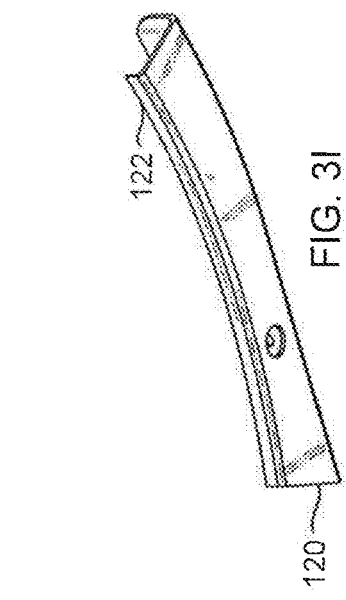
FIG. 3E
FIG. 3G
FIG. 3I
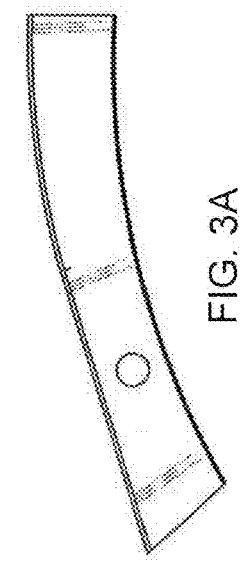
FIG. 3C
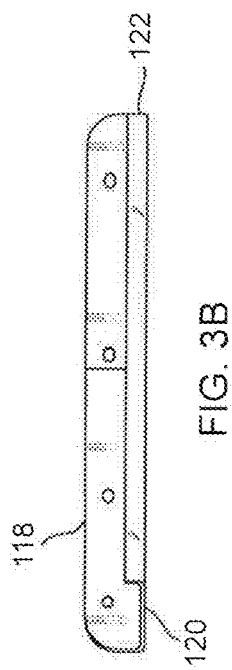
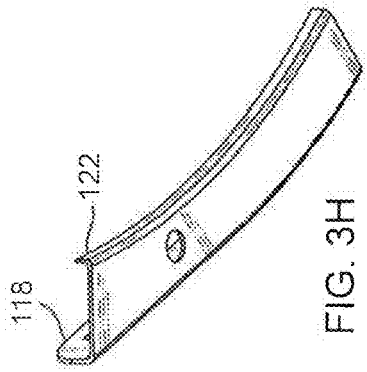
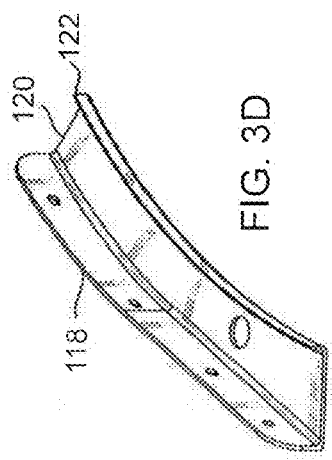
FIG. 3D
FIG. 3F
FIG. 3H
(PRIOR ART)

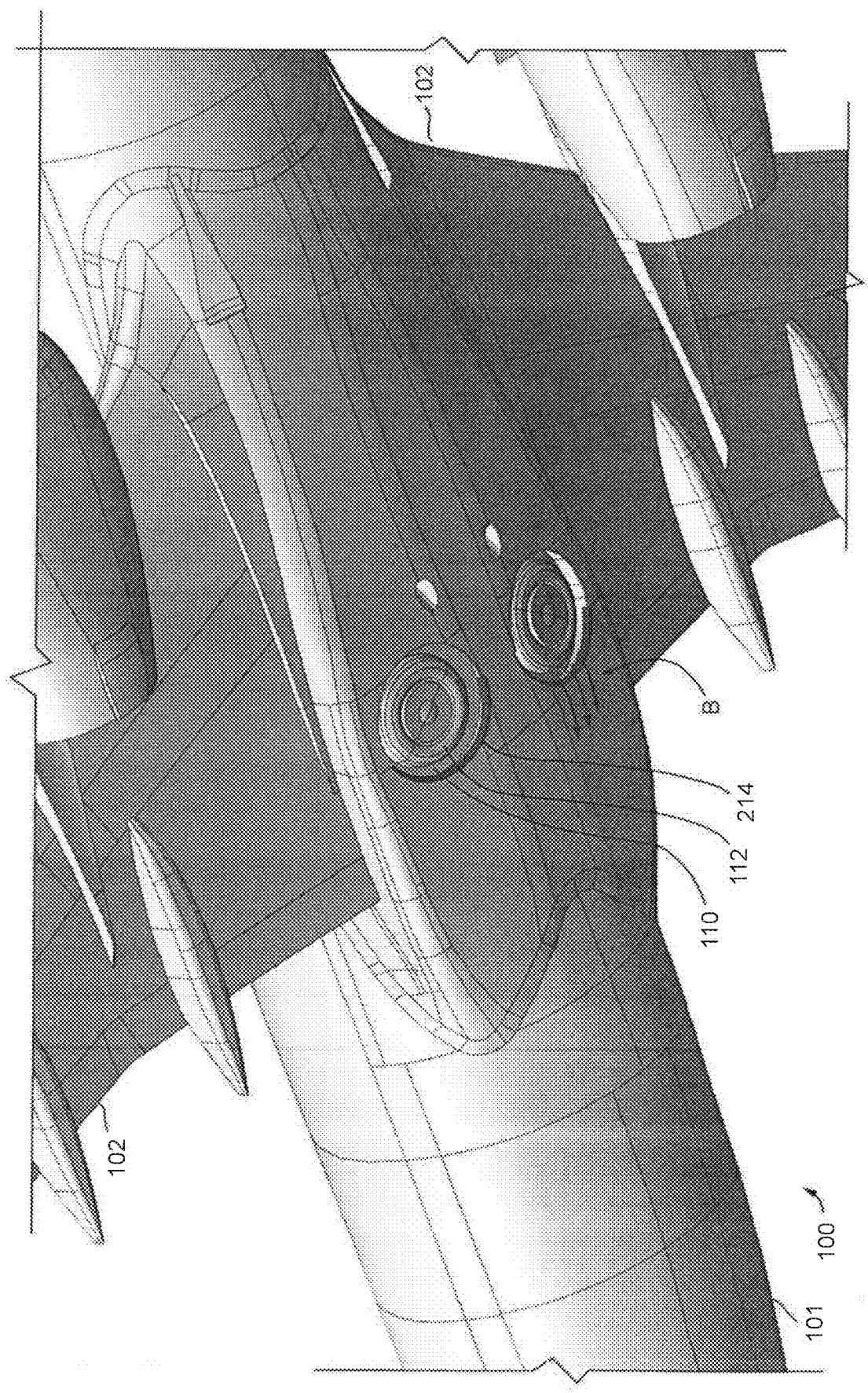

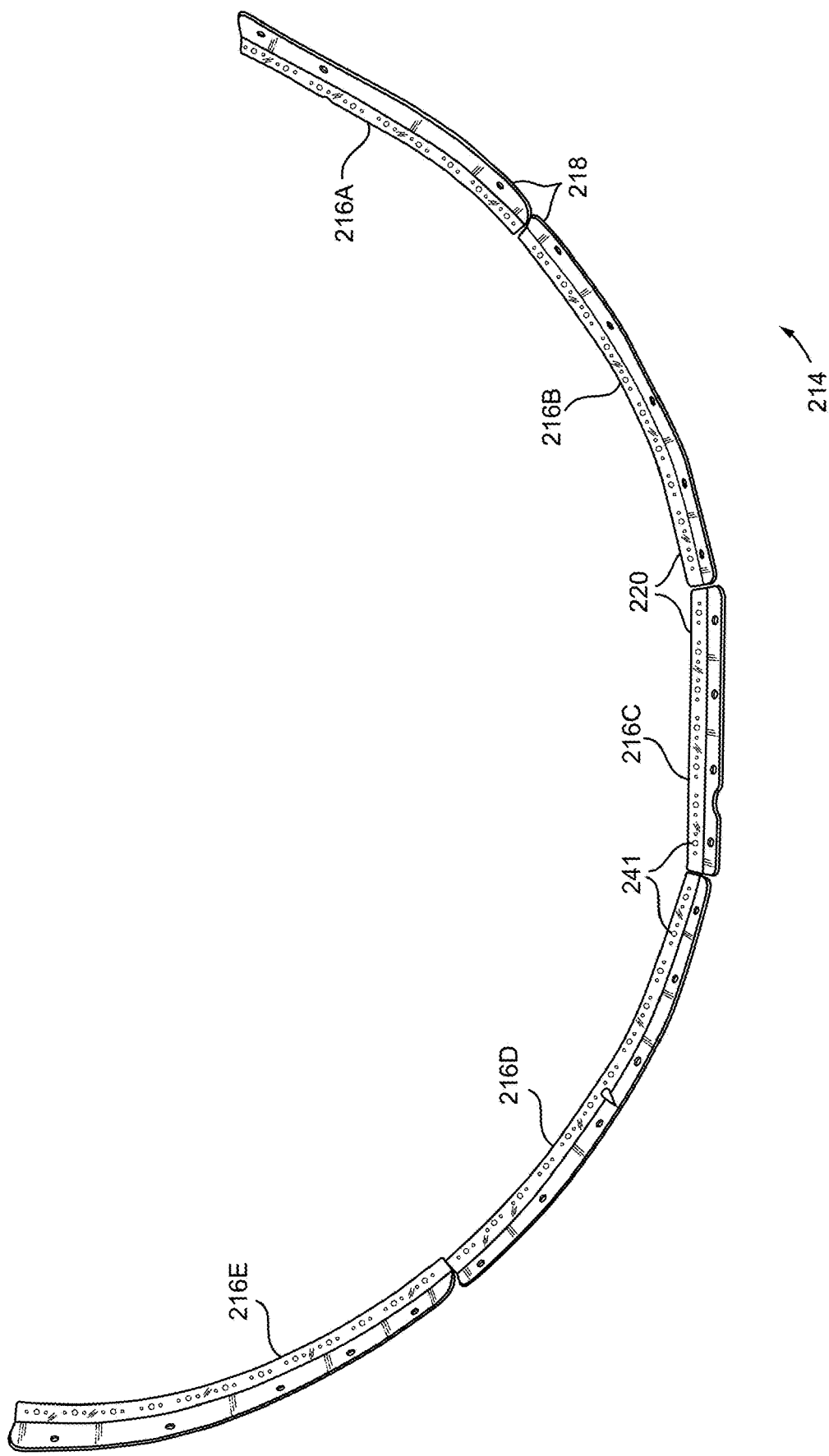

214A

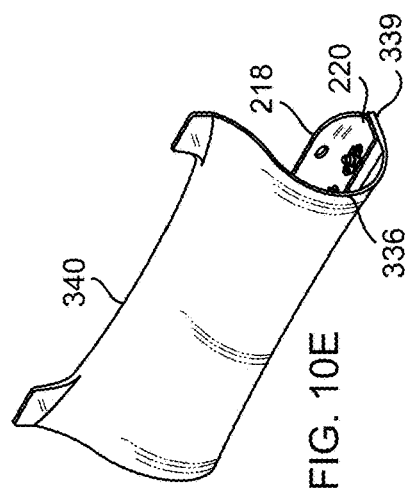
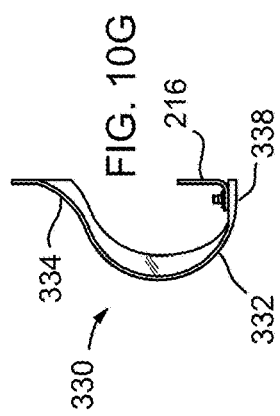
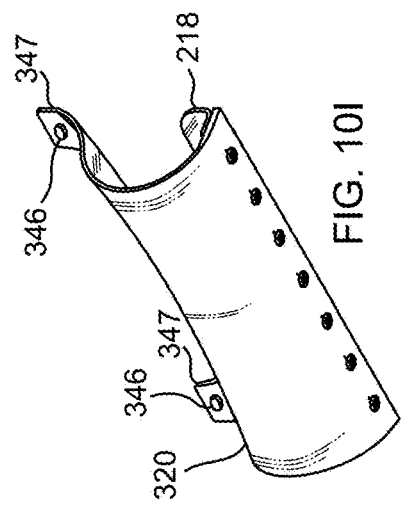
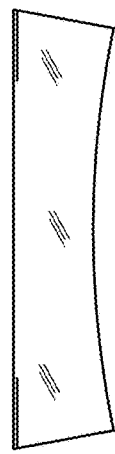
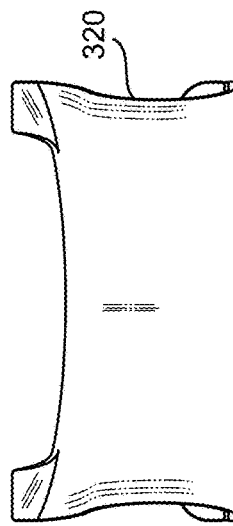
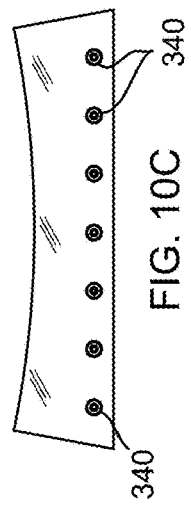
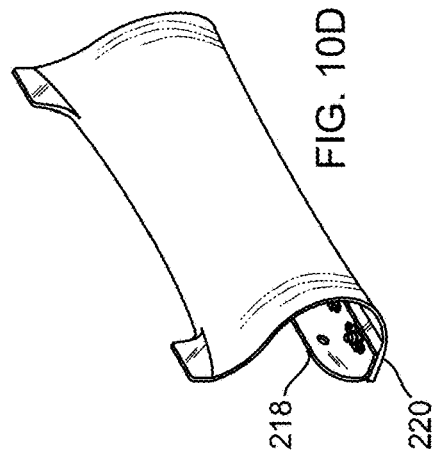
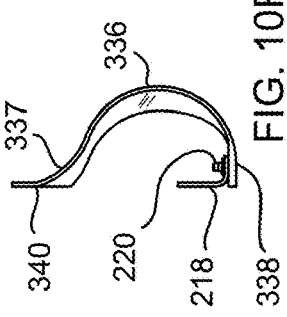
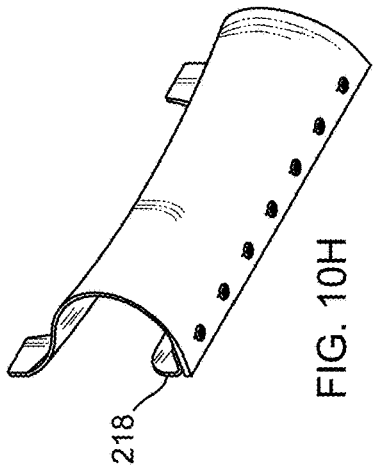

214E

WHEEL WELL FAIRING FOR AN AIRCRAFT

CROSS-REFERENCE TO RELATED APPLICATION

This patent application claims benefit under 35 U.S.C. § 371 to international application No. PCT/US2019/023332 filed on Mar. 21, 2019, which claims priority to U.S. provisional Application No. 62/647,242, filed Mar. 23, 2018, the contents of which are incorporated by reference herein in their entireties.

FIELD OF INVENTION

The invention relates to an aircraft fairing, and more specifically to a fairing mounted at a wheel well of an aircraft.

BACKGROUND OF INVENTION

Aircraft with retractable landing gear can have an open wheel well configuration, as opposed to a wheel well with a moveable (openable and closable) wheel well landing gear door, which is typically called a "pocket door." The open wheel well design eliminates the weight and complexity of the wheel well door, at the expense of drag and noise. The drag and noise is caused by the wheel well ingesting and ejecting air flow in a disorganized fashion. Various aircraft manufacturers, such as the Boeing model 737 aircraft and the Cessna Citation family aircraft are common examples of the open wheel well design practice.

The amount of recirculation, drag, and noise is typically proportional to the volume of the wheel well not displaced by the landing gear assembly, Flexible gaskets or seals are often used to reduce the volume open to ingestion of air and recirculation. Even with the flexible seals installed, open wheel wells must still be configured with significant clearance between the outer diameter of the tire and the inner diameter of the wheel well opening. For example, sufficient clearance must be provided to allow a tire to be retracted into the wheel well without damaging the surrounding structure. As such, the clearance from the opening also ingests, i.e., allows, air to enter at the forward portion of the wheel well and circulate in a chaotic manner in the large volume or chamber that forms the wheel well. The ingested air is subsequently ejected from the aft area of the wheel well and into the fuselage surface air flow at a steep angle normal to the bottom surface of the fuselage. The mixing of the freestream flow outside of the wheel well from the ejected flow can cause significant pressure drag and noise on the aft surface of the wheel well.

The use of the Coanda effect to turn airflow has been in wide use for many years. It is the effect that allows a flow to follow a curved surface as on the flaps of an aircraft wing, as generally disclosed in U.S. Pat. No. 4,447,028 to Wang. A Coanda fairing using this effect is positioned immediately downstream of an open wheel well.

Referring to FIG. 1, a bottom right side perspective view of a portion of an aircraft 100 (e.g., Boeing 737 model aircraft) having open right and left wheel wells 110 with corresponding main landing gear and wheels 112 retracted therein is illustratively shown. Each wheel well 110 includes a flat wheel well fairing 114, as best seen in FIG. 2. In FIG. 2, the prior art wheel well fairing 114 is formed by a plurality of flat L-shaped angle bracket segments 116A through 116E (individually or collectively segments 116), each which are attached adjacently to a next segment end-to-end along an inner periphery of the wheel well 110 to form a semi-circular fairing shape, as illustratively shown in FIGS. 1 and 2. Each segment 116 includes a horizontal leg 120, an upwardly directed vertical leg 118, which together form the L-shaped bracket, and a flange or lip 122 extending upwardly from the horizontal leg portion 120 opposite of and substantially parallel to the vertical leg 118, as illustratively shown in the various views of the first segment 116A and third segment 116C in FIGS. 3A-4I. The horizontal leg 120 and lip 122 form the aerodynamic features of the fairing 114. The vertical leg 118 is provided for mounting the flange 114 to the inner wheel well, and has no aerodynamic function.

The partial radius (i.e., cross-section) of the fairing segments 116 has been limited in practice to ninety degrees or less. However, the lip 122 of the flat wheel well fairing 114 acts as a restriction to the exiting air, and therefore does not significantly reduce the drag and noise observed at the open wheel well of an aircraft. More specifically, the lip 122 traps and diverts the aft exiting airflow to recirculate in the aft area of the wheel well, they causing pressure drag on the aft most wall of the wheel well. This air then travels forward and is ejected along the back of the tire. In FIG. 1, arrow "A" illustrate ejected air flowing out of the wheel wells 110 which forms a vertical wall of air which has a high velocity and is directed substantially normal to fuselage 101. The ejected air initially flows downwardly and then intermixes and collides with the surface air flow below the bottom hull of the aircraft, thereby causing air separation on the lower hull aft of the wheel well 110, which induces drag and noise aft of the wheel wells 110.

In view of the aforementioned and other deficiencies in the prior art, it is desirable to provide an aft wheel well fairing that minimizes airflow separation, and thus reduces drag and noise observed both inside of and at an aft portion of an open wheel well of an aircraft.

SUMMARY OF THE INVENTION

The above disadvantages and deficiencies in the prior art are avoided and/or solved by various embodiments of a Coanda shaped wheel well fairing positioned at an aft portion of each wheel well of an aircraft. The wheel well fairing of the present invention redirects airflow out of the wheel well from a direction substantially normal to the bottom surface of the fuselage, to a direction substantially parallel to the bottom surface of the fuselage, thereby reducing air separation and the undesirable drag and noise byproducts caused by the air separation.

In one embodiment, a wheel well fairing is provided for reducing drag on an aircraft having a fuselage configured with an open wheel well for stowing landing gear of the aircraft, the wheel well fairing comprising a Coanda fairing having a convex-shaped lower portion and an upper portion, the upper portion being configured for positioning adjacent an interior vertically-orientated sidewall of the wheel well, the convex-shaped lower portion having a bottom surface configured to extend substantially parallel to and positioned adjacent with an outer hull surface of the fuselage.

In one aspect, the convex-shaped lower portion is curved radially inwardly within the wheel well between the upper portion and bottom surface.

In another aspect, the convex-shaped lower portion extends about an aft portion of the wheel well. The convex-shaped lower portion circumscribes at least ninety degrees along the aft portion of the wheel well. Alternatively, the convex-shaped lower portion circumscribes one-hundred and eighty degrees along the aft portion of the wheel well.

In still another aspect, the bottom surface of the convex-shaped lower portion is configured with matching angles and contours as outer hull surface of the fuselage.

In one aspect, the upper portion has a concave-shaped curvature and extends from the convex-shaped lower portion, and wherein the concave-shaped upper portion is configured for positioning adjacent the interior vertically-orientated sidewall of the wheel well. In another aspect, the concave-shaped upper portion has a radius less than a radius of the convex-shaped lower portion.

In one aspect, the upper portion is linear-shaped and extends from the convex-shaped lower portion, wherein the linear-shaped upper portion is configured for positioning adjacent the interior vertically-orientated sidewall of the wheel well.

In one aspect, the wheel well fairing further comprises an angle bracket configured for mounting the wheel well fairing to the interior vertically-orientated sidewall of the wheel well. The angle bracket can be L-shaped or substantially L-shaped. In another aspect, the bottom surface of the convex-shaped lower portion is attached to a horizontal leg of the angle bracket via at least one fastener. Moreover, the bottom surface of the convex-shaped lower portion includes one of a counter-bore and countersink configured to receive a head portion of one of the at least one fasteners. In another aspect, a vertical leg of the angle bracket is configured for attachment to the interior vertically-orientated sidewall of the wheel well.

In one aspect, the upper portion is configured for mounting the wheel well fairing to the interior vertically-orientated sidewall of the wheel well.

In one aspect, the wheel well fairing is configured for installation on an open wheel well of one of a BOEING model 737 NG-700, 737 NG-800 and 737 NG-900 aircraft to reduce drag and noise by reducing airflow separation aft of a wing to fuselage junction. In another aspect, the wheel well fairing is configured for installation on an open wheel well of one of a BOEING model 737 MAX-7, 737 MAX-8, 737 MAX-9, and 737 MAX-10 aircraft to reduce drag and noise by reducing airflow separation aft of a wing to fuselage junction.

In one aspect, air expelled out of the aft portion of the wheel well is at a low pressure and high velocity and flows in a direction rearward along the outer hull surface of the fuselage. In another aspect, the upper portion is configured to direct air flow downwardly out of the wheel well, and the convex-shaped lower portion is configured to turn the air flow approximately ninety degrees and along the outer hull surface of the fuselage.

BRIEF DESCRIPTION OF THE DRAWINGS

FIGS. 3A-3I depict various views of a first angle bracket section of the plurality of prior art angle bracket sections of FIG. 1 and respectively illustrating a top plan view, a front elevation view, a bottom view, a left front top perspective view, right front top perspective view, a left side elevation view, a right side elevation view, a left front bottom perspective view, and right front bottom perspective view;

FIG. 5 depicts a bottom, right side perspective view of an aircraft having its main landing gear and wheels retracted and stowed within the open right and left wheel wells and illustrating a wheel well fairing of the present invention circumscribing an aft portion of each wheel well;

FIG. 6 is a bottom perspective view of a plurality of angle bracket sections of the wheel well fairing of FIG. 5 and illustratively shown being aligned serially to form a curved shape corresponding to an open wheel well of an aircraft;

FIGS. 10A-10I depict various views of a third Coanda fairing section of FIG. 6 arranged with a corresponding third angle bracket section of the plurality of angle bracket sections of FIG. 7, and respectively illustrating a top plan view, a front elevation view, a bottom view, a left front top perspective view, right front top perspective view, a left side elevation view, a right side elevation view, a left front bottom perspective view, and a right front bottom perspective view;

FIGS. 11A-11I depict various views of a fourth Coanda fairing section of FIG. 6 arranged with a corresponding fourth angle bracket section of the plurality of angle bracket sections of FIG. 7, and respectively illustrating a top plan view, a front elevation view, a bottom view, a left front top perspective view, right front top perspective view, a left side elevation view, a right side elevation view, a left front bottom perspective view, and a right front bottom perspective view;

Figure 1:
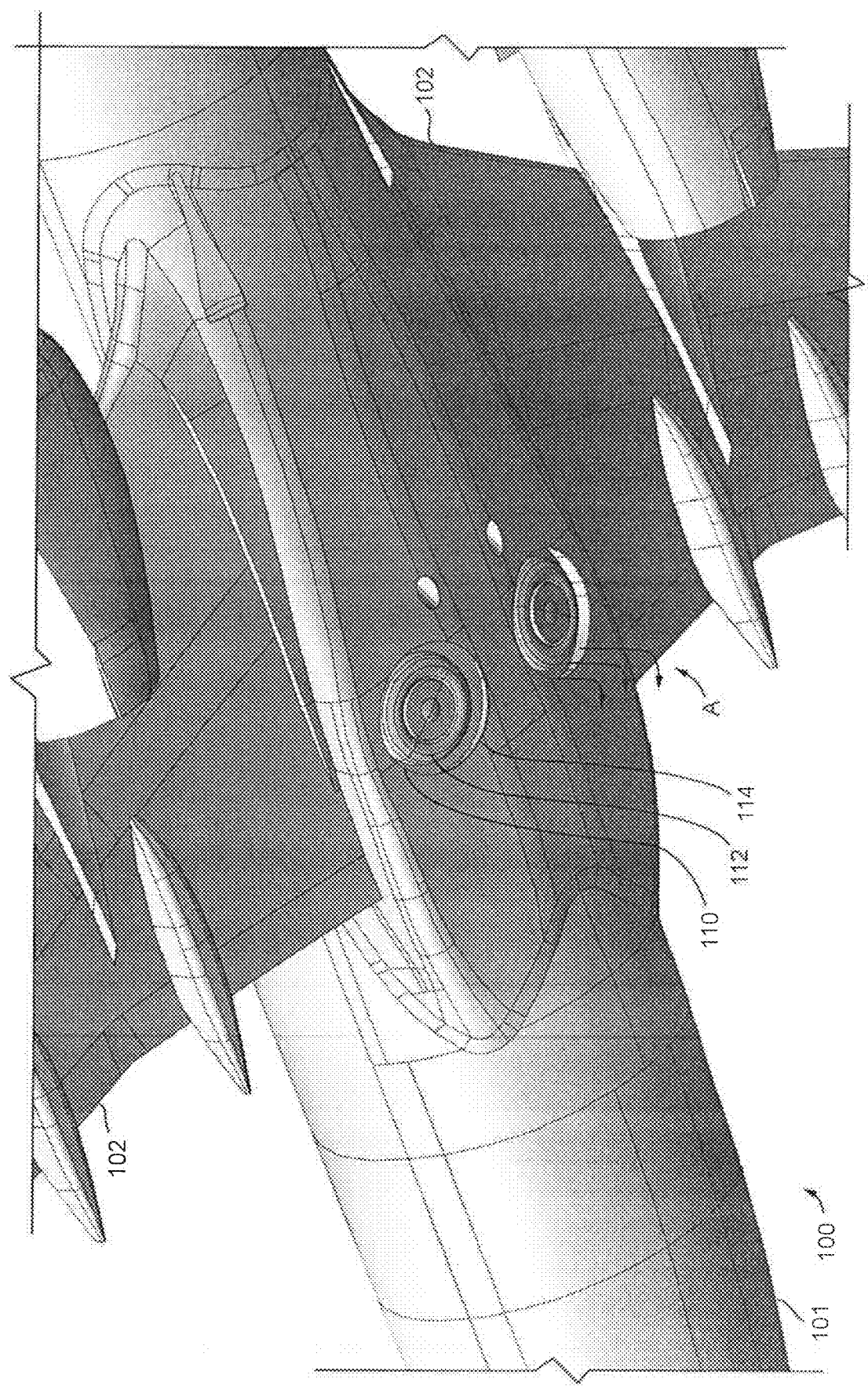
FIG. 1 depicts a bottom, right side perspective view of an aircraft having its main (rear) landing gear and wheels retracted and stowed within corresponding open right and left wheel wells and illustrating a prior art wheel well fairing circumscribing a portion of each wheel.

To further facilitate an understanding of the invention, the same reference numerals have been used, when appropriate, to designate the same or similar elements that are common to the figures. Further, unless otherwise indicated, the features shown in the figures are not drawn to scale, but are shown for illustrative purposes only.

DETAILED DESCRIPTION OF THE EMBODIMENTS

The present invention is directed to a wheel well fairing which is installed about an aft portion of each main landing gear wheel well. Each wheel well fairing is configured and contoured to induce a Coanda effect over an exterior surface of the wheel well fairing so as to redirect air flowing downwardly out of the wheel well, i.e., in a direction substantially normal to the fuselage, to a rearward direction which is substantially parallel to the outer hull surface of the fuselage. In this manner, the discharged air flow from the open wheel wells is turned rearwardly at the exterior surface of the fairing and intersects and mixes substantially parallel with the surface air flowing along the bottom portion of the fuselage without inducing the separation of airflow as currently observed prior art wheel well fairings. More specifically, the wheel well fairings of the present invention redirect the airflow out of the open wheel well to reduce the airflow separation, drag and noise commonly observed at the bottom portion of the fuselage immediately aft of the open wheel wells for the landing gear of the aircraft.

Referring to FIG. 5, a bottom, right-side perspective view of an aircraft 100 having its main (rear) landing gear and wheels 112 retracted and stowed within a pair of open, circular wheel wells 110. Each wheel well 110 includes a corresponding wheel well fairing 214 of the present invention. The wheel well fairing 214 circumscribes at least an aft portion of the wheel well 110, and in FIG. 5, is illustratively shown circumscribing approximately one-half or approximately one-hundred and eighty (180) degrees along the aft portion of the wheel well 110, although such circumferential length, number of degrees and/or percentage of the circumference of a wheel well 110 is not considered limiting. For example, each fairing 214 can circumscribe approximately ninety (90) degrees (e.g., an aft quarter of the wheel well circumference) to nearly the entire wheel well circumference (360 degrees), subject to exclusion of a portion 119 (FIG. 16) of the wheel well 110 at which the landing gear 112 support structures (struts, shock absorbers, wheels, brake systems etc.) extend from and retract into a stowed position within the wheel well 110. The curvature of the exterior surface of the wheel well fairing 214 induces a Coanda effect to redirect the air being ejected downwardly and out of the wheel well 110, to flow along the curvature of the exterior surface of the wheel well fairing 214 and thereby turn approximately ninety degrees in a horizontal and rearwardly direction, as shown by arrow "B" in FIG. 5. Referring to FIG. 1 and comparing the prior art wheel well airflow shown by arrow A to the air flow illustratively shown by arrow B in FIG. 5, it can be seen that the ejected air out of the wheel wells 110 having the Coanda fairing 214 of the present invention is redirected over the exterior surface of the fairing 214 so as to turn rearwardly and intermix and flow with the surface air much closer to the outer hull of the aircraft 100 than previously observed with the prior art wheel well fairings 114. In fact, the Coanda fairing 214 causes the air flowing out of the wheel well 110 to be at a lower pressure and higher velocity as compared to the prior art wheel well fairings 114, as discussed below in greater detail with respect to FIGS. 20A-21B. As such, the Coanda fairing 214 turns the air flow rearwardly and substantially parallel to fuselage 101 to smoothly intermix with the surface air flow along the bottom hull of the aircraft, thereby significantly reducing air separation, drag and noise at the aft portion of the wheel well 110.

Figure 7:
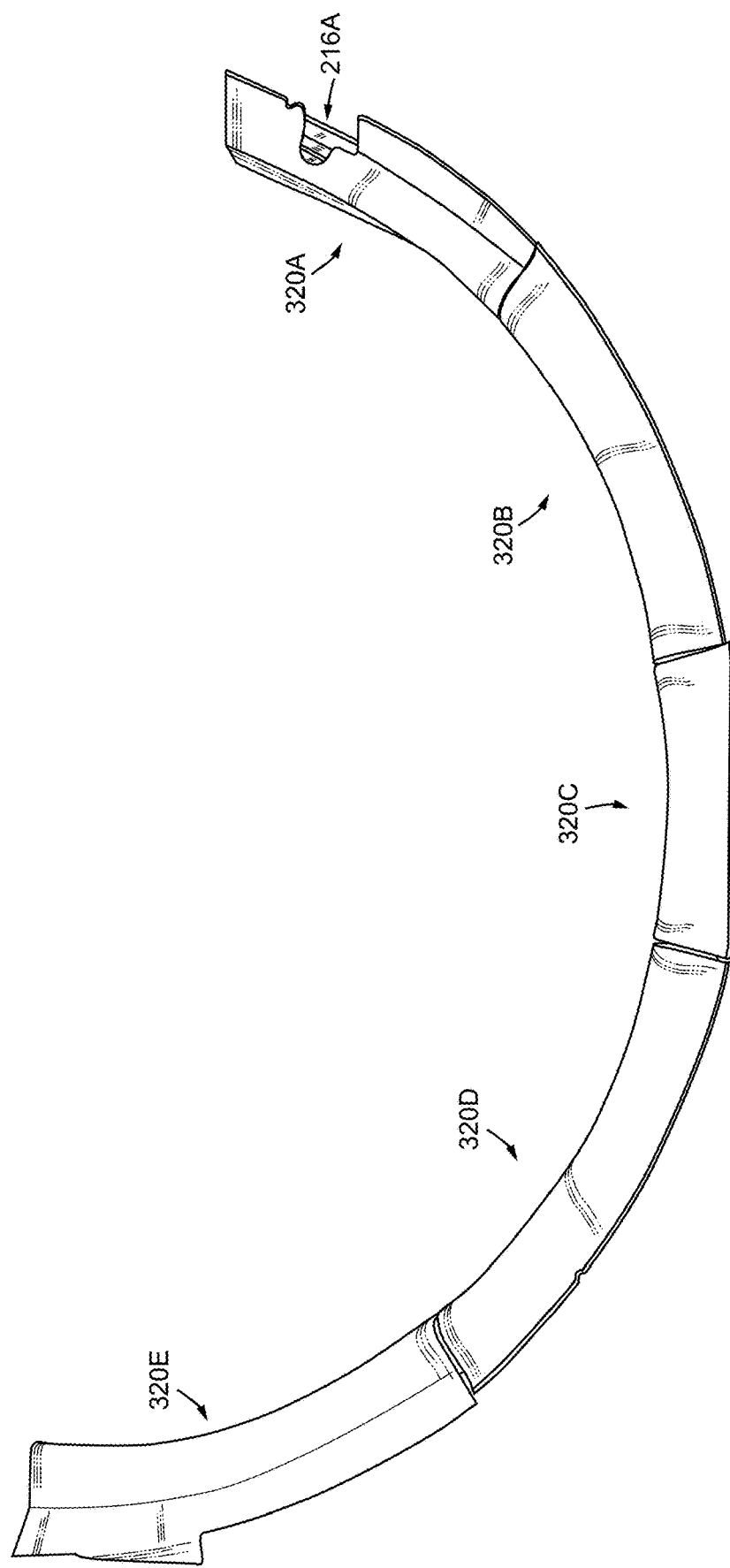
FIG. 7 is a bottom perspective view of a plurality of Coanda fairing sections positioned over the angle bracket sections of FIG. 6 and illustratively being aligned serially to form the curved shape corresponding the an open wheel well of the aircraft.
Figure 8E:
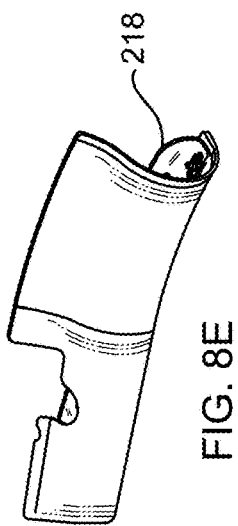
FIGS. 8A-8I depict various views of a first Coanda fairing section of FIG. 6 arranged with a corresponding first angle bracket section of the plurality of angle bracket sections of FIG. 7, and respectively illustrating a top plan view, a front elevation view, a bottom view, a left front top perspective view, right front top perspective view, a left side elevation view, a right side elevation view, a left front bottom perspective view, and a right front bottom perspective view.
Figure 8G:
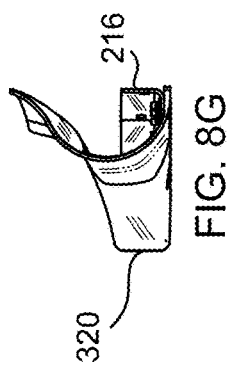
Figure 8I:
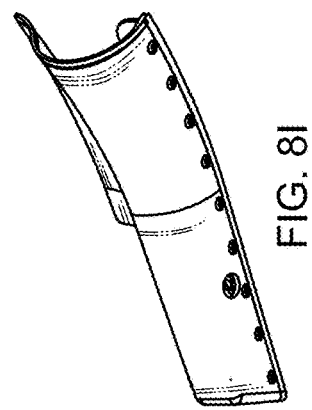
Figure 8A:
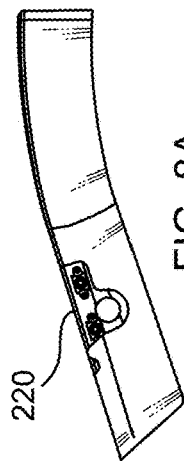
Figure 8B:
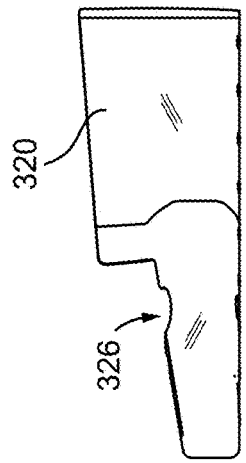
Figure 8C:
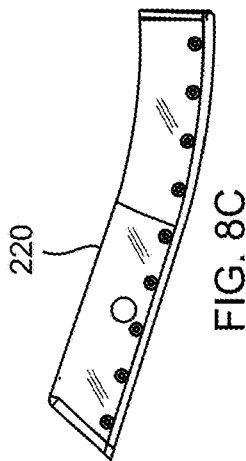
Figure 8D:
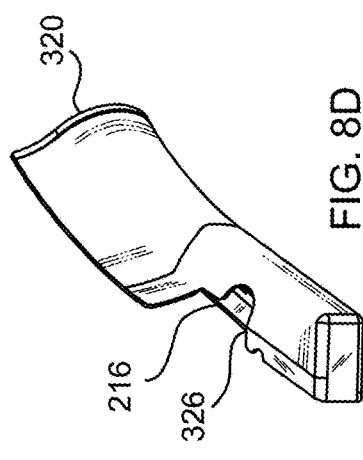
Figure 8F:
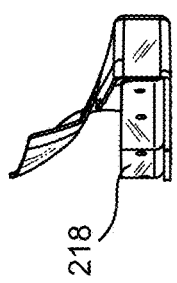
Figure 8H:
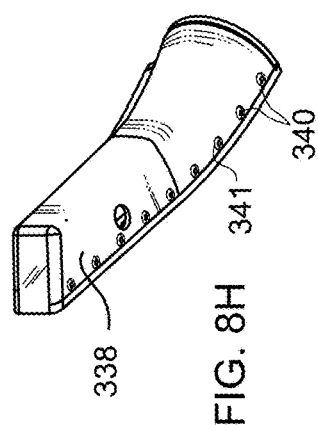

Referring now to FIGS. 6 and 7, the illustrative wheel well Coanda fairing 214 is formed in sections, illustratively from five L-shaped angle brackets 216A-216E (collectively 216) and five corresponding Coanda fairing sections 320A-320E (collectively 320) that are positioned over the L-shaped angle brackets 216. The L-shaped angle bracket sections 216A-216E shown in FIG. 6 and the corresponding Coanda fairing sections 230A-230E shown in FIG. 7 are positioned serially, i.e., end-to end to form a wheel well Coanda fairing 214 which, when installed on the aircraft 100, would illustratively circumscribe approximately one-hundred and eighty (180) degrees about the aft portion of the wheel well 110, as shown in FIG. 5. Although five fairing sections 216, 230 are shown in the drawings to form the fairing 214, such quantity is discussed for illustrative purposes only and is not considered limiting. Preferably, the Coanda fairing 214 does not extend greater than one-hundred and eighty degrees about the aft portion of the wheel well 110.

The Coanda fairing 214 is preferably formed in sections to enable customization for attachment within the wheel well 110. That is, the fairing 214 may require custom fitting around various protuberances such as, for example, hydraulic lines, power conduits, fasteners, and other structural projections that cannot be readily repositioned and which could interfere with installation of the fairing 214. Referring to FIGS. 8A-12I, the individual sections of the L-shaped angle brackets 216 can include bends, bores, holes, cutouts and the like to accommodate such structural protuberances around the circumference of the wheel well 110. Alternatively, where there are only a few or no protuberances present around the circumference of the wheel well 110, fewer sections or a single elongated fairing 214 can be fabricated and installed around the circumference of at least the aft portion of the wheel well 110.

Figure 2:
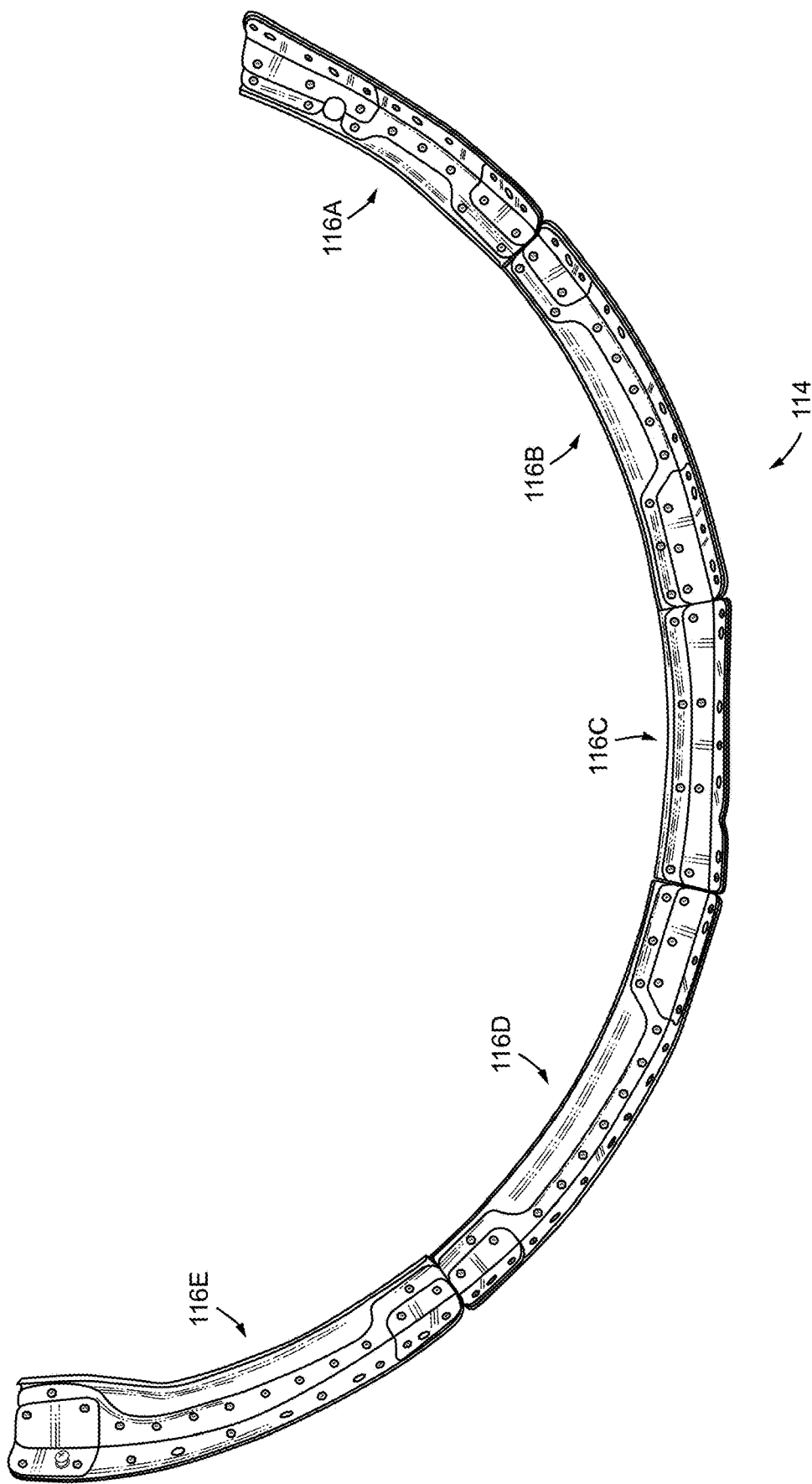
FIG. 2 is a top perspective view of a prior art wheel well fairing formed by a plurality of angle bracket sections which are aligned serially to form a curved shape corresponding to an open wheel well of an aircraft.
Figure 4E:
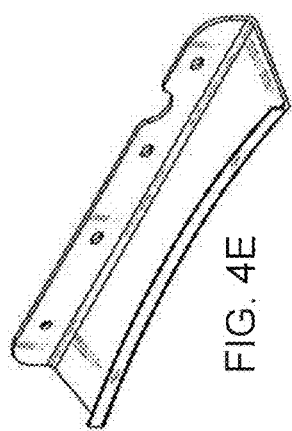
FIGS. 4A-4I depict various views of a third angle bracket section of the plurality of prior art angle bracket sections of FIG. 1 respectively illustrating a top plan view, a front elevation view, a bottom view, a left front top perspective view, right front top perspective view, a left side elevation view, a right side elevation view, a left front bottom perspective view, and right front bottom perspective view.
Figure 4G:
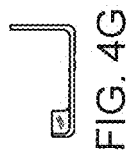
Figure 4I:
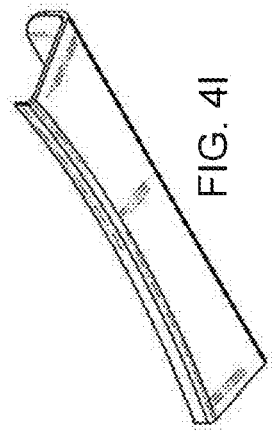
Figure 4A:
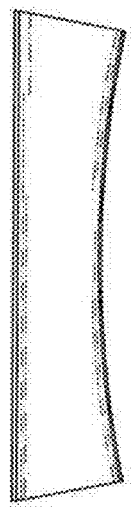
Figure 4B:
Figure 4C:
Figure 4D:
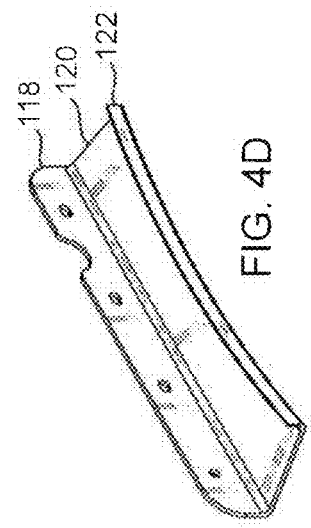
Figure 4F:
Figure 4H:
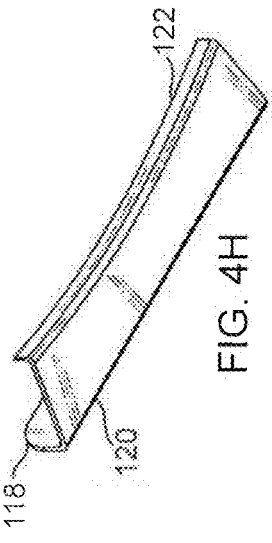

Referring again to FIG. 6, each L-shaped angle bracket section 216 includes a vertical leg 218 and a horizontal leg 220. By comparison, the angle bracket sections 216 of the present invention do not include the upright lip portion 122 of the prior art angle bracket sections 116, as shown in the prior art fairing 114 of FIGS. 2 and 3. Each vertical leg 218 includes a plurality of holes 224, which are preferably equally spaced apart and used for attaching the fairing sections to the inner sidewall 111 (FIG. 17) of the wheel well 110 via a fastener (e.g., machine screw, rivet, bolt, and the like—not shown). The horizontal and vertical legs 218, 220 of each segment 216 can be customized to include bends, cutouts and other openings 226 to accommodate various mechanical considerations such as hydraulic lines, and other structural protuberances around the wheel wells 110, as discussed above. During installation of the fairing 214, the vertical legs 218 of the angle bracket sections 216 are first attached to the sidewall 111 of the wheel well 110 via the fasteners, and then the corresponding Coanda fairing sections 320 are attached to the mounted angle bracket sections 216, as discussed below in further detail with respect to FIGS. 10A-10I.

Referring again to FIGS. 6 and 7, the wheel well Coanda fairing 320 is fabricated with a smooth, curved exterior surface to help air flow smoothly transition from the interior portion of the wheel well 110 to the outer hull surface along the fuselage 101 of the aircraft aft of the wheel well. The Coanda fairing sections 320 and L-shaped angle bracket sections 216 can be fabricated from well-known materials such as fiberglass, carbon fiber, Kevlar, Vectran or other aerospace grade reinforcing fibers and plastics. The fairing assembly 214 can also be fabricated from metals such as aluminum, steel, stainless steel, titanium, or other aerospace grade metals, or a combination of composite and metal materials. Processes for fabricating the fairing assembly 214 can include forming, molding, machining, additive manufacturing, or combination of these practices. Once the fabrication process of the fairing assembly is completed, the fairing assembly 214 can be attached as a kit to older aircraft, or incorporated in to the wheel well 110 as a part of a new aircraft design.

Figure 16:
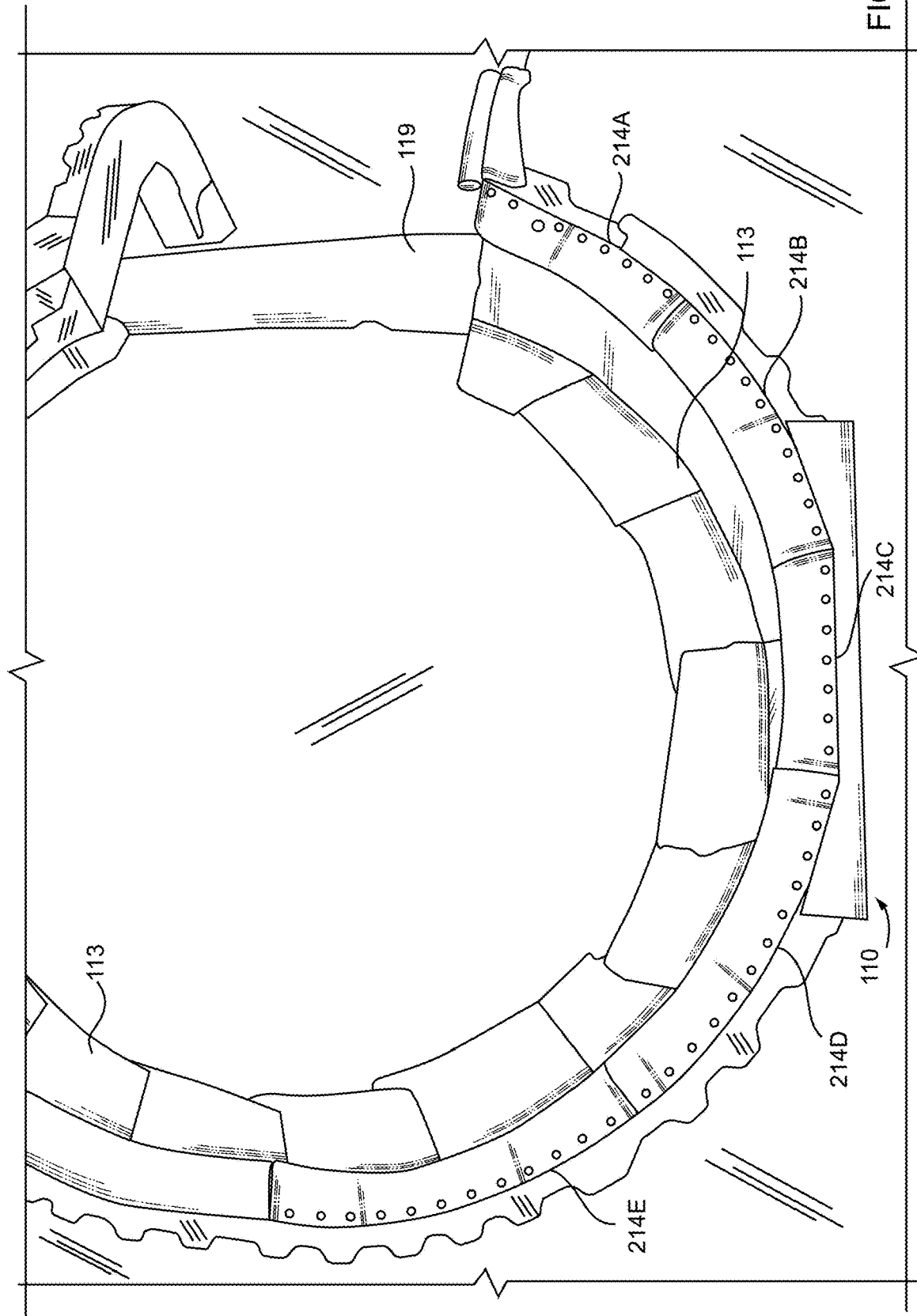
FIG. 16 depicts a bottom view of the right wheel well of an aircraft having a wheel well fairing of the present invention installed along an aft portion of the wheel well.
Figure 17:
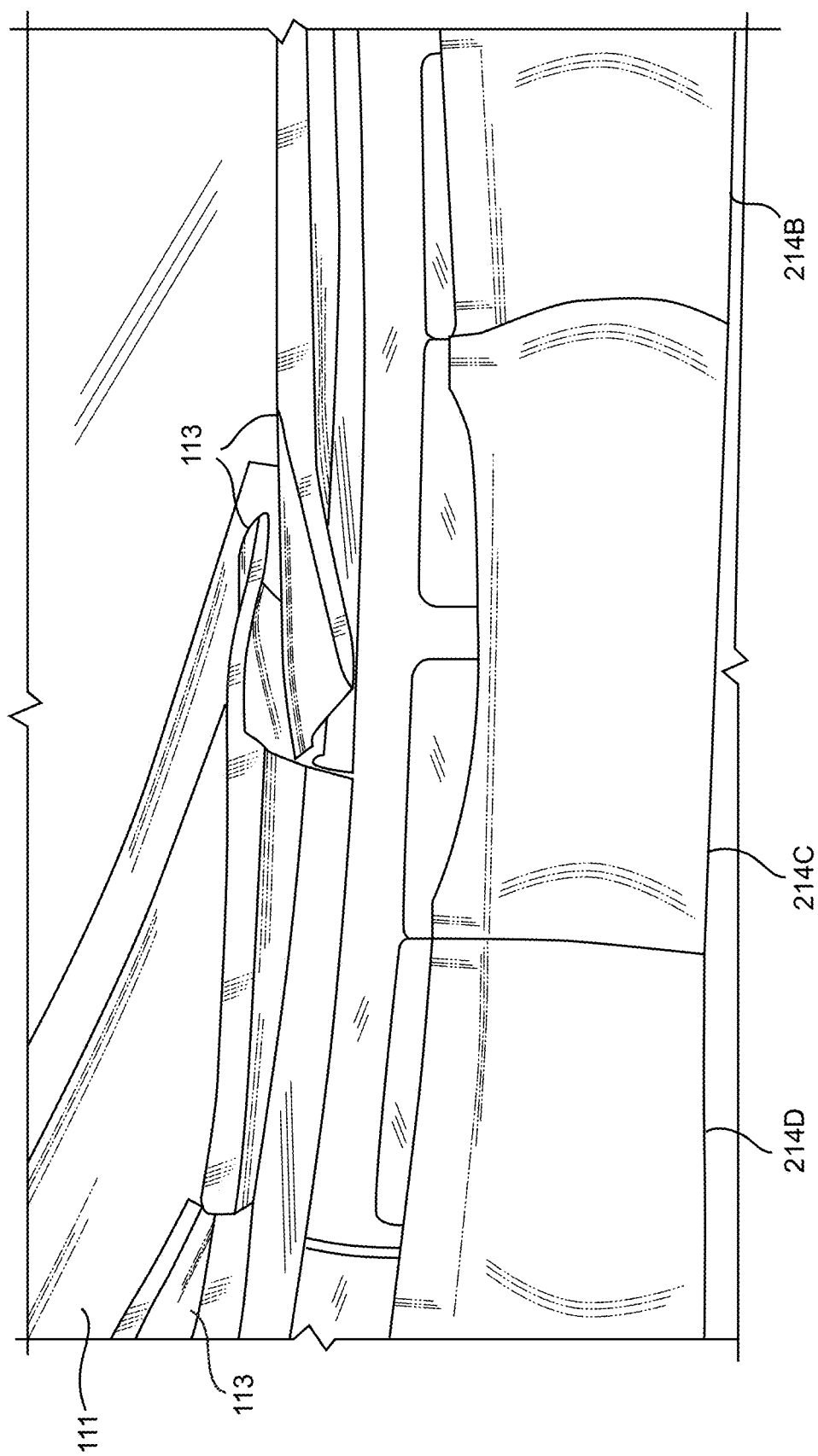
FIG. 17 depicts a bottom aft perspective view of the right wheel well of FIG. 16 depicting a second, third and fourth sections of the wheel well fairing of the of the present invention installed along the aft portion of the wheel well.
Figure 18:
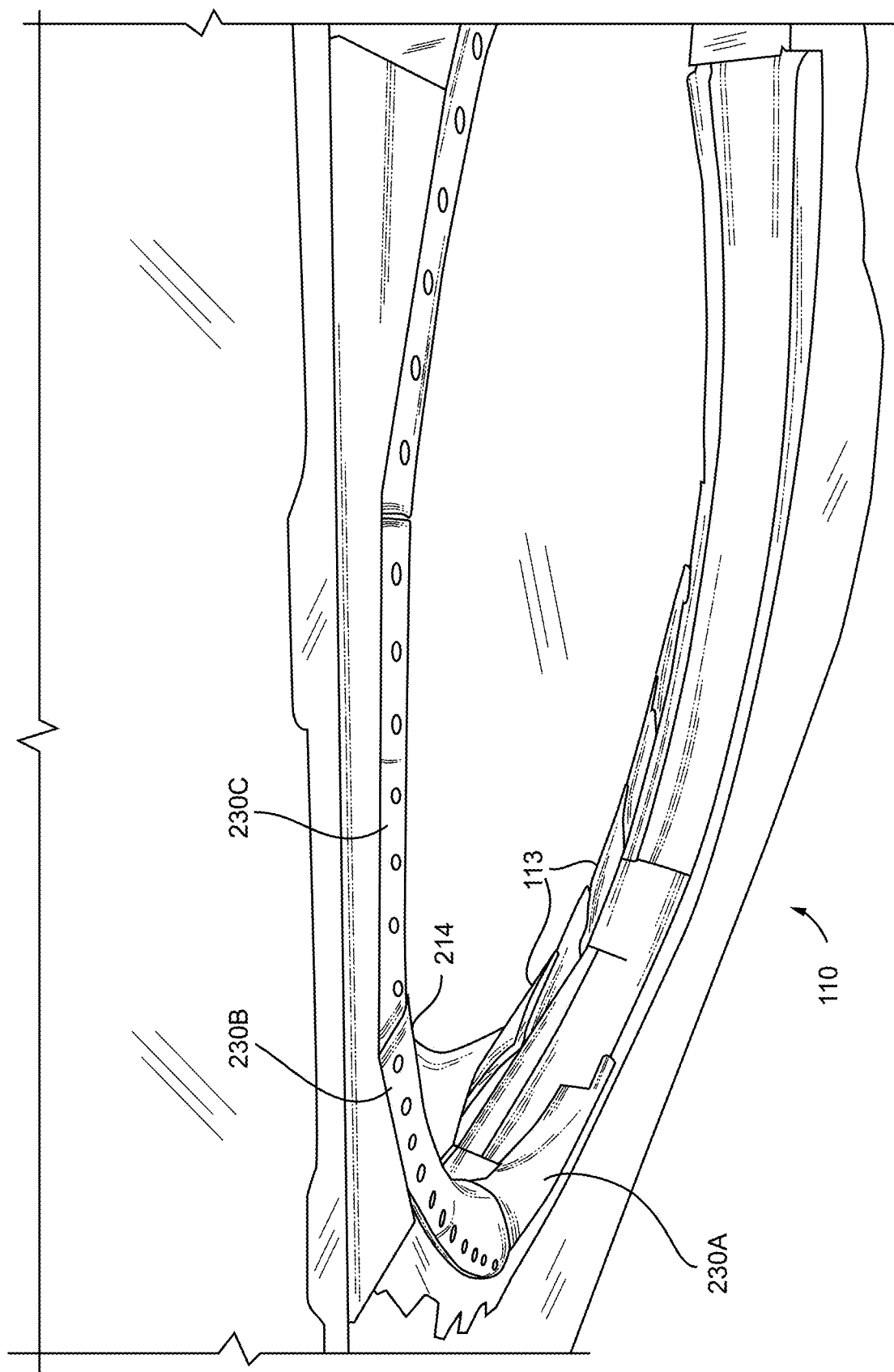
FIG. 18 depicts a bottom, front perspective view of the right wheel well of FIG. 16 illustrating the wheel well fairing of the present invention installed along the aft portion of the wheel well.
Figure 19:
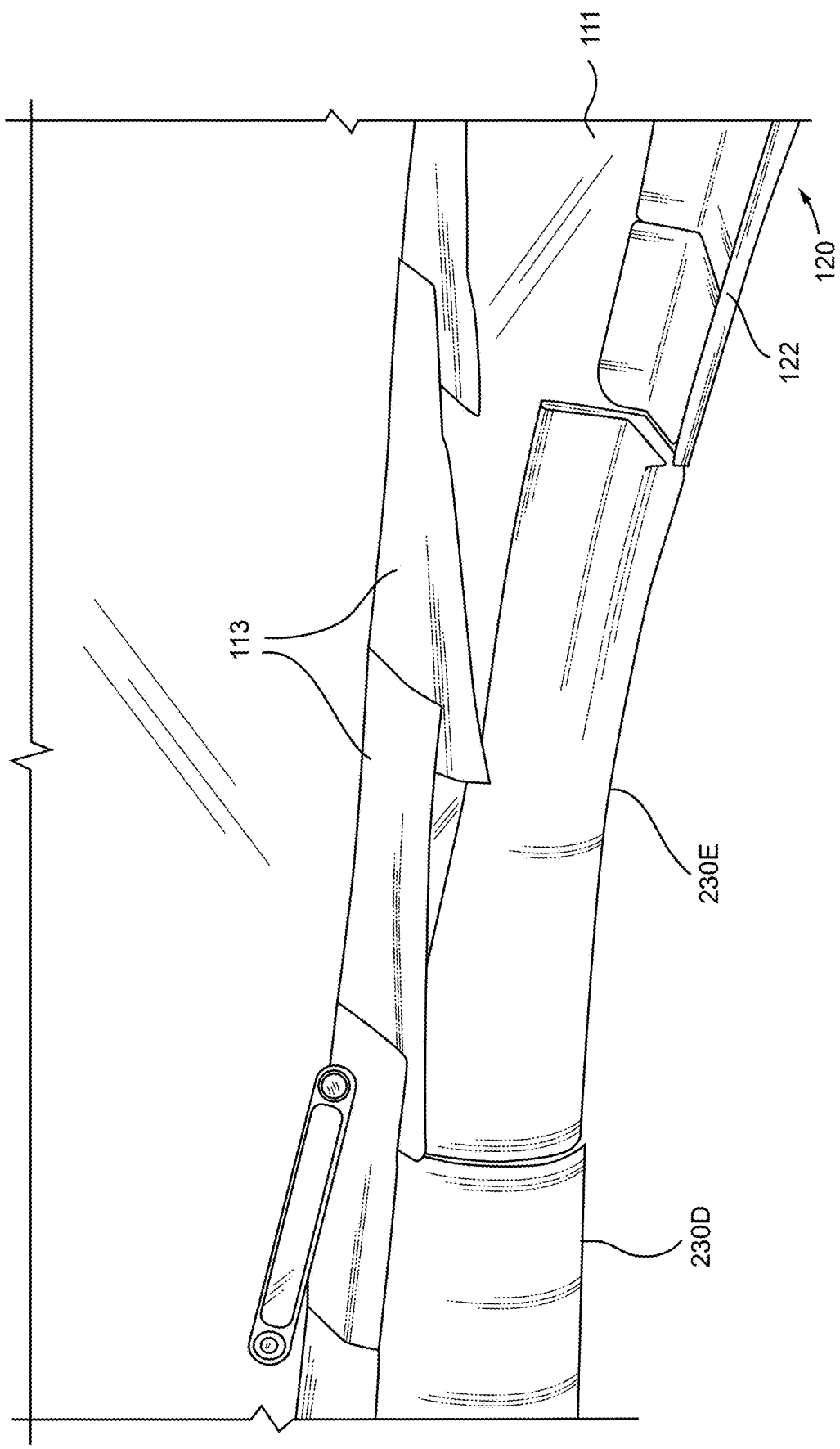
FIG. 19 depicts a bottom aft view of the aircraft of FIG. 16 illustrating a bottom perspective view of the wheel well fairing sections installed along the aft portion of the wheel well.

Referring to FIG. 8, various views of a first Coanda fairing section 320A of FIG. 7 arranged with a corresponding first angle bracket section 216A of the plurality of angle bracket sections of FIG. 6 are shown, and respectively illustrate a) a top plan view, b) a front elevation view, c) a bottom view, d) a left front top perspective view, e) right front top perspective view, f) a left side elevation view, g) a right side elevation view, h) a left front bottom perspective view, and i) a right front bottom perspective view. FIGS. 9-12 respectively illustrate the same various views of the second through fifth Coanda fairing sections 320B-E of FIG. 7 arranged with the second through fifth angle bracket section 216B-E of the plurality of angle bracket sections of FIG. 6. For sake of best understanding the orientation of the five illustrative wheel well fairing sections 214 when installed in the aft portions of the right main landing gear wheel wells 110 of an aircraft 100, the reader is directed to FIGS. 16-19 in which FIG. 16 depicts a bottom view of each fairing section 214 installed in the aft portion of the right wheel well 110; FIG. 17 depicts a front elevation view of the second, third and fourth wheel well fairing sections 214B-214D installed in the right wheel well 110; FIG. 18 depicts a bottom, front right side perspective view of the wheel well fairing sections 214; and FIG. 19 depicts a bottom, aft view of the aircraft 100 illustrating a bottom, front perspective view of the wheel well fairing sections 214.

Referring again to FIG. 8, the individual sections of the Coanda fairing 320 can also include bends, bores or holes, cutouts 326 and the like in a similar manner as the L-shaped brackets 216 to accommodate various protuberances such as, for example, hydraulic lines, conduits, fasteners, and other projections positioned around the circumference of the wheel well 110.

Figure 9E:
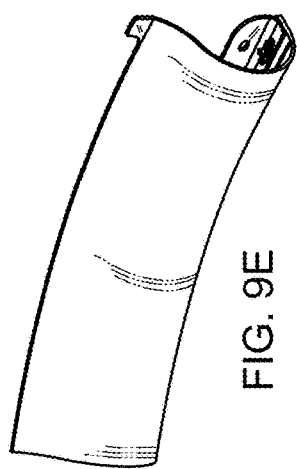
FIGS. 9A-9I depict various views of a second Coanda fairing section of FIG. 6 arranged with a corresponding second angle bracket section of the plurality of angle bracket sections of FIG. 7, and respectively illustrating a top plan view, a front elevation view, a bottom view, a left front top perspective view, right front top perspective view, a left side elevation view, a right side elevation view, a left front bottom perspective view, and a right front bottom perspective view.
Figure 9G:
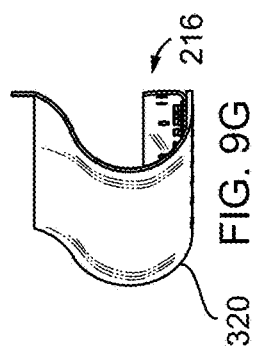
Figure 9I:
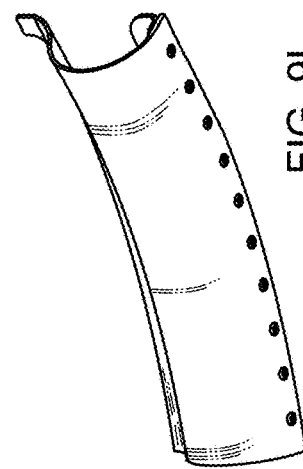
Figure 9A:
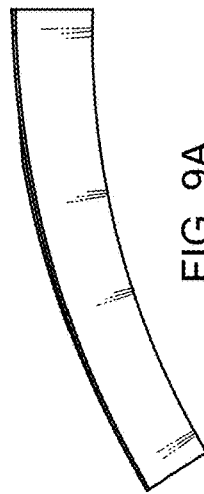
Figure 9B:
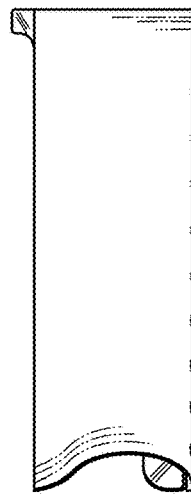
Figure 9C:
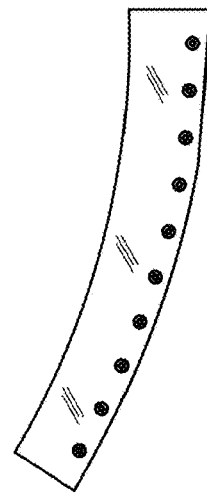
Figure 9D:
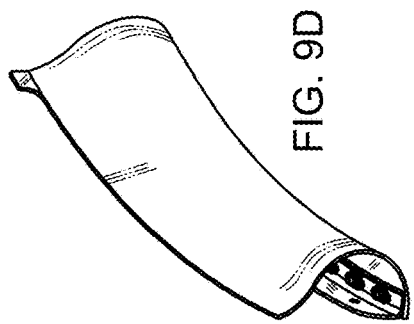
Figure 9F:
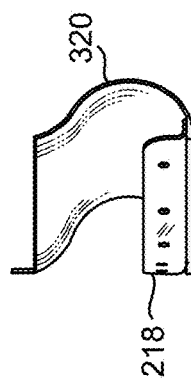
Figure 9H:
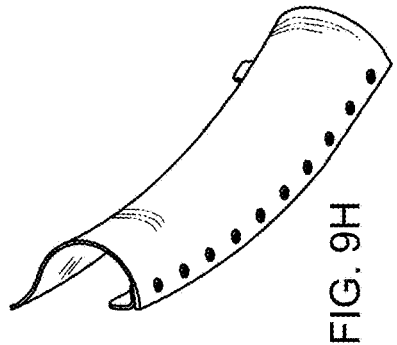
Figure 11E:
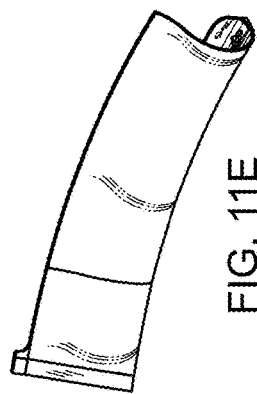
Figure 11I:
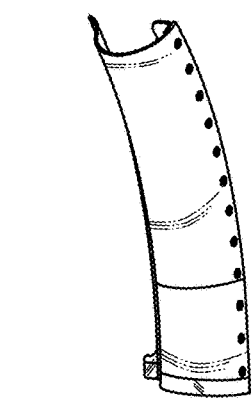
Figure 11A:
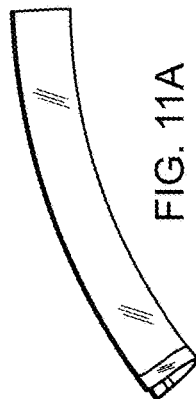
Figure 11G:
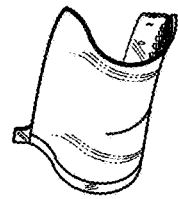
Figure 11D:
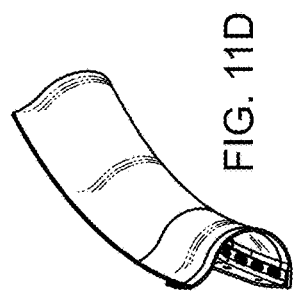
Figure 11F:
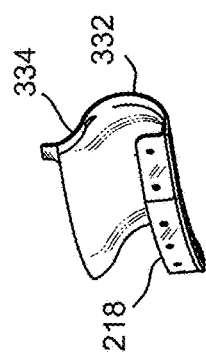
Figure 11H:
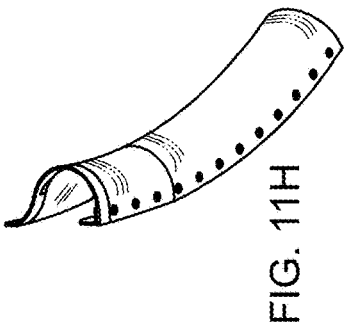
Figure 12E:
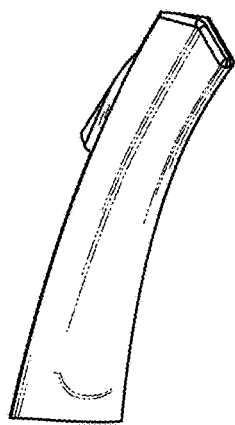
FIGS. 12A-12I depict various views of a fifth Coanda fairing section of FIG. 6 arranged with a corresponding fifth angle bracket section of the plurality of angle bracket sections of FIG. 7, and respectively illustrating a top plan view, a front elevation view, a bottom view, a left front top perspective view, right front top perspective view, a left side elevation view, a right side elevation view, a left front bottom perspective view, and a right front bottom perspective view.
Figure 12G:
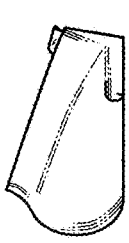
Figure 12I:
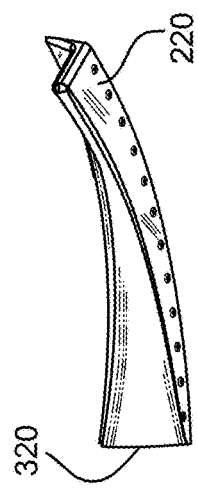
Figure 12A:
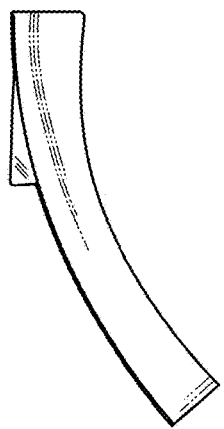
Figure 12B:
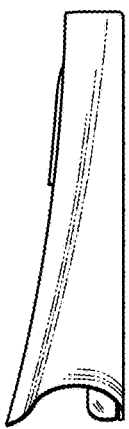
Figure 12C:
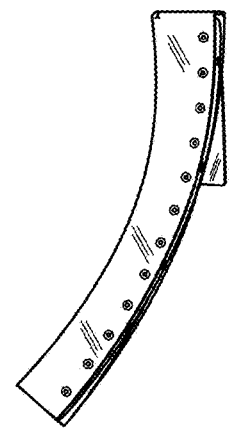
Figure 12D:
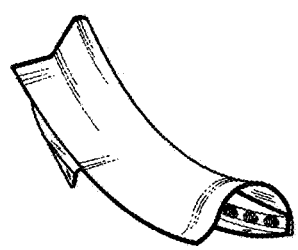
Figure 12F:
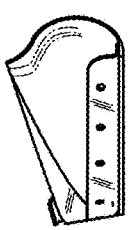
Figure 12H:
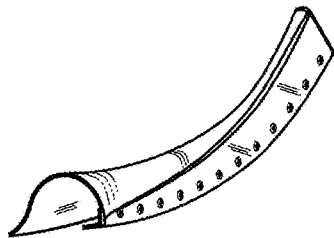

Referring to FIGS. 9G, 10G and 11G, side elevation views or profiles of the Coanda fairing 320 and corresponding angle bracket 216 are illustratively shown. The Coanda fairing 320 has a generally G-clef or S curvilinear shape curvature which, in one embodiment, is formed by a larger convex-shaped lower portion 332 and a smaller concave-shaped upper portion 334 as shown in FIG. 10G. In particular, the convex-shaped lower portion 332 is generally formed by a substantially semi-circular portion 336 (FIG. 10E) having a linear bottom portion 338 terminating at a first free end 339. The concave-shaped upper portion 334 is generally formed by a curved surface 337 (FIG. 10F) having a circumferential length extending radially approximately ninety (90) degrees such that a distal free end 340 of the Coanda fairing 320 terminates in a direction substantially normal to the linear bottom portion 338, as illustratively shown in FIG. 10F.

Each Coanda fairing section 320 is attached to a corresponding one of the L-shaped angle sections 216 via a fastener 340 (FIG. 10C), such as a machine screw, rivet or other fastener. The Coanda fairing sections 320 are preferably attached to the horizontal legs 220 of the angle bracket sections 216 after the angle bracket sections 216 are attached to the inner sidewall 111 of the wheel well 110, as discussed above. More specifically, the bottom portion 338 of the Coanda fairing 320 includes a plurality of holes 341 (FIG. 8H) which are aligned with a corresponding plurality of holes 241 (FIG. 6) in the horizontal legs 220 of the angled bracket sections 216. The horizontal leg 220 of the angle bracket 216 is positioned over an interior surface of the linear bottom portion 338 such that the horizontal leg holes 241 are aligned with the Coanda fairing holes 341. The fasteners 340 are then threaded or otherwise inserted through or into the holes 341/241 to secure the Coanda fairing section 320 to the corresponding angle bracket section 216. Preferably, a counter-bore or countersink (not shown) is formed about each Coanda fairing hole 341 to receive the corresponding head of the fasteners 340 so that it does not protrude above the bottom surface of the Coanda fairing 320 and cause undesirable air flow disturbances and drag.

Figure 13:
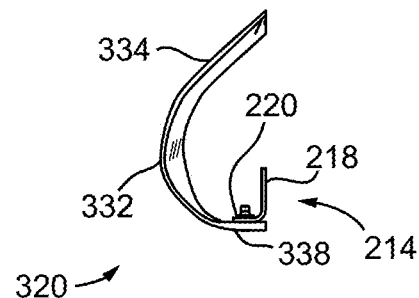
FIG. 13 is a right side elevation view of an alternative embodiment of the wheel well fairing of the present invention.

Referring to FIG. 13, an alternative shape of the Coanda fairing segments 320 is illustratively shown such as, e.g., the third Coanda fairing section 216C. The Coanda fairing 320 includes the convex-shaped lower portion 332 with a substantially linear bottom portion 338, as described above with respect to the embodiment of FIGS. 8-12. However, in this alternative embodiment, the upper portion 334 of the Coanda fairing segment 320 is shaped substantially linear, as opposed to having a substantially concave-shaped upper portion. The linear-shaped upper portion 334 also directs the flow of air out of the wheel well 110 and around the exterior surface of the larger convex-shaped lower portion 332 to turn and expel the airflow approximately ninety degrees rearwardly from the wheel well 110.

In another embodiment, the Coanda fairing segments 320 can be attached to the interior sidewall 111 of the wheel well 110 directly at the upper portion 334 of the fairing segments 320. For example, referring to FIG. 10I, a plurality of holes 346 can be formed along a length of the upper portion 334 of the Coanda fairing segments 320. The holes 346 can be provided along the entire length of the upper portion 334 or in one or more tabs 347 provided along a length of the upper portion 334 of the Coanda fairing segments 320. A person of ordinary skill in the art will appreciate that where the Coanda fairing segments 320 are substantially rigid, the implementation of the angle bracket 214 may be omitted for attachment to the sidewall 111 of the wheel well 110.

Referring now to FIGS. 16-19, the wheel well Coanda fairing sections 214 are illustratively shown mounted to the right main landing gear wheel wells 110 by the L-shaped angle bracket 216 as discussed above. The Coanda fairing 320 is mounted to the wheel well 110 such that the bottom portion 338 of the Coanda fairing 320 is substantially aligned and flush with (i.e., at the same or substantially the same angle as) the surrounding outer hull surface of the fuselage 101.

Figure 14:
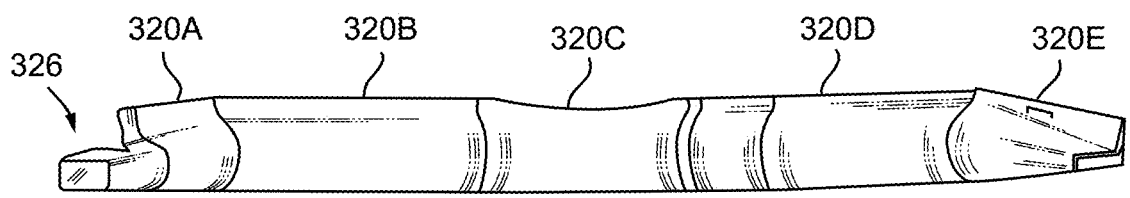
FIG. 14 is a front elevation view of the right wheel well fairing of FIGS. 6 and 7.
Figure 15:
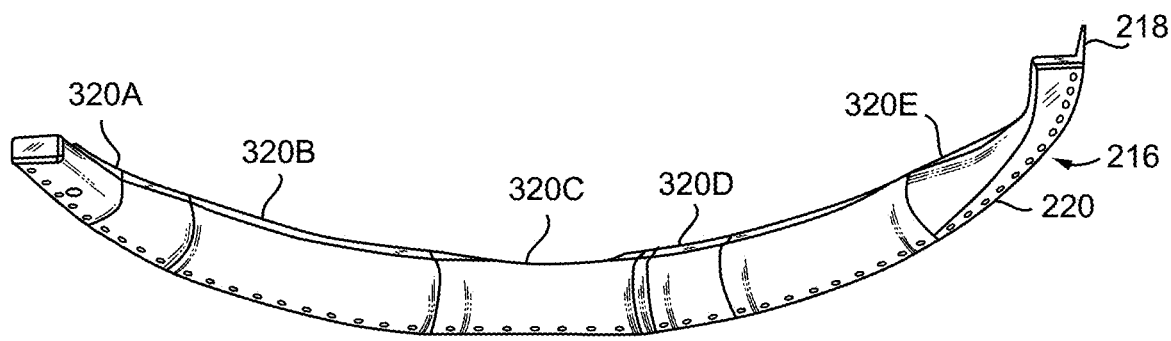
FIG. 15 is a bottom, front perspective view of the right wheel well fairing of FIGS. 6 and 7.

Referring to FIGS. 14 and 15, the opposing ends of the Coanda fairing 230 are preferably bent over and curved differently than the G-clef or S-shaped portions of the fairing 214. For example, the left side section 230A includes various bends and cutouts to accommodate the main landing gear and other structural protuberances within the wheel well 110, as discussed above. In addition, referring to FIG. 14, both end sections (e.g., sections 230A and 230E) are curved and sloped downwardly from the adjacent section towards the distal end of the corresponding L-shaped angle brackets 216E to direct the wheel well air flow at the end sections 230A, 230E towards the centrally located sections (e.g., sections 230B-230D) and then rearwardly out of the wheel well 110. For example, referring to FIG. 19, the end Coanda fairing section 230E is illustratively shown with an inclined slope from its end towards the adjacent section 230D.

Referring now to FIGS. 16-19, the wheel well fairing 214 is illustratively shown mounted at an aft section of the right wheel well. A person of ordinary skill in the art will appreciate that the wheel well fairing assembly 214 can be installed in the left wheel well and/or other aircraft wheel wells in a similar manner. In FIG. 16, the fairing 214 is shown partially circumscribing a flexible gasket or seal 113 which is attached above the L-shaped brackets 216 of the fairing 214. The flexible seal 113 circumscribes and preferably contacts a lower surface of the stowed wheels of the landing gear to help reduce airflow into the wheel wells 110. The flexible seal 113 is discussed for sake of completeness to better understand the configuration of the wheel wells 110 as shown in the drawings and does not form a part of the invention.

Figure 20A:
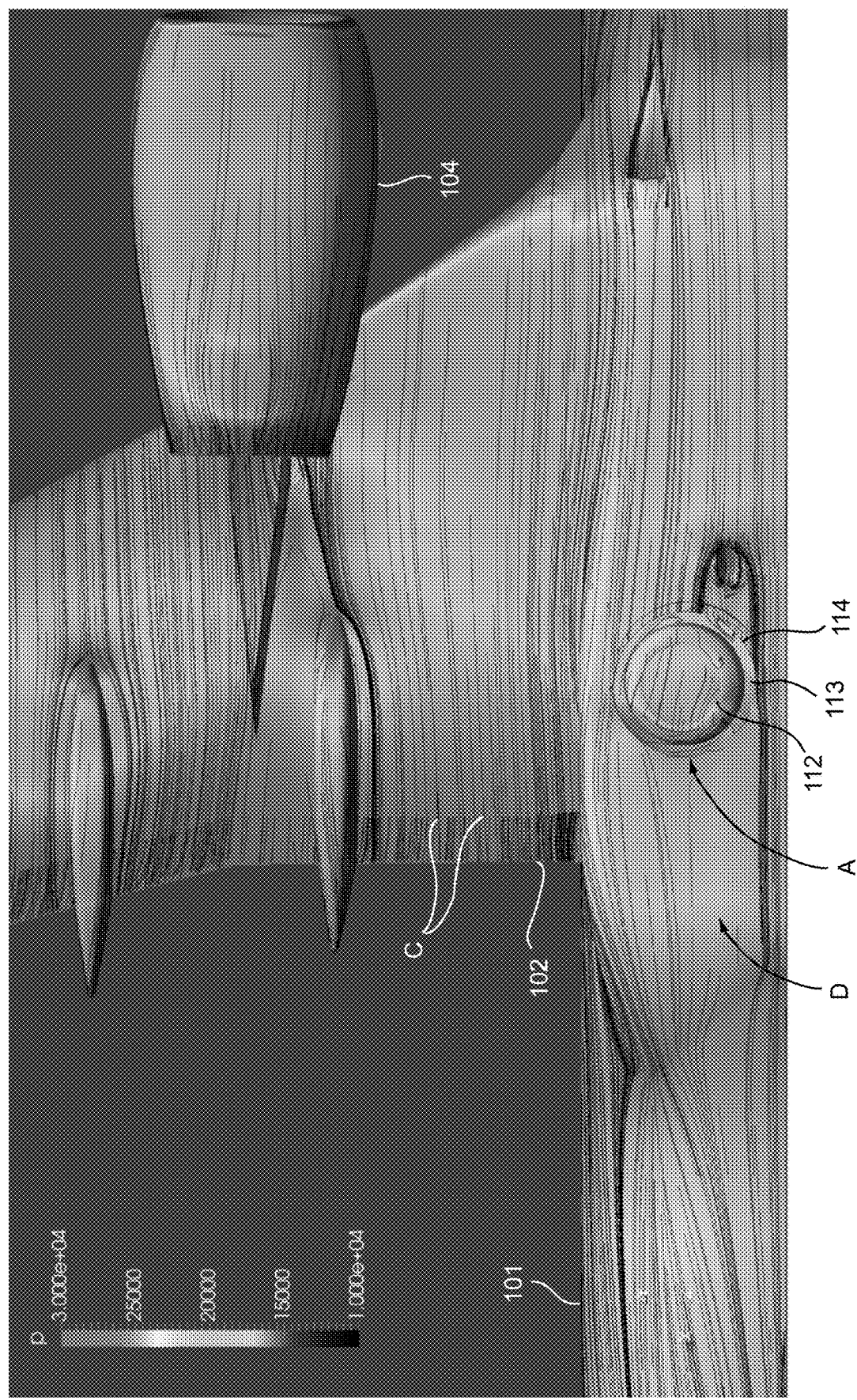
FIG. 20A (prior art) and FIG. 20B are graphical images of bottom views of an aircraft without and with the wheel well fairing of the present invention mounted at the aft portion of an open right wheel well of the aircraft, respectively, and comparatively displaying computer simulations of high and low velocity surface air flow and turbulence about the open right wheel well of the aircraft with and without the aft wheel well fairing installed thereon.
Figure 20B:
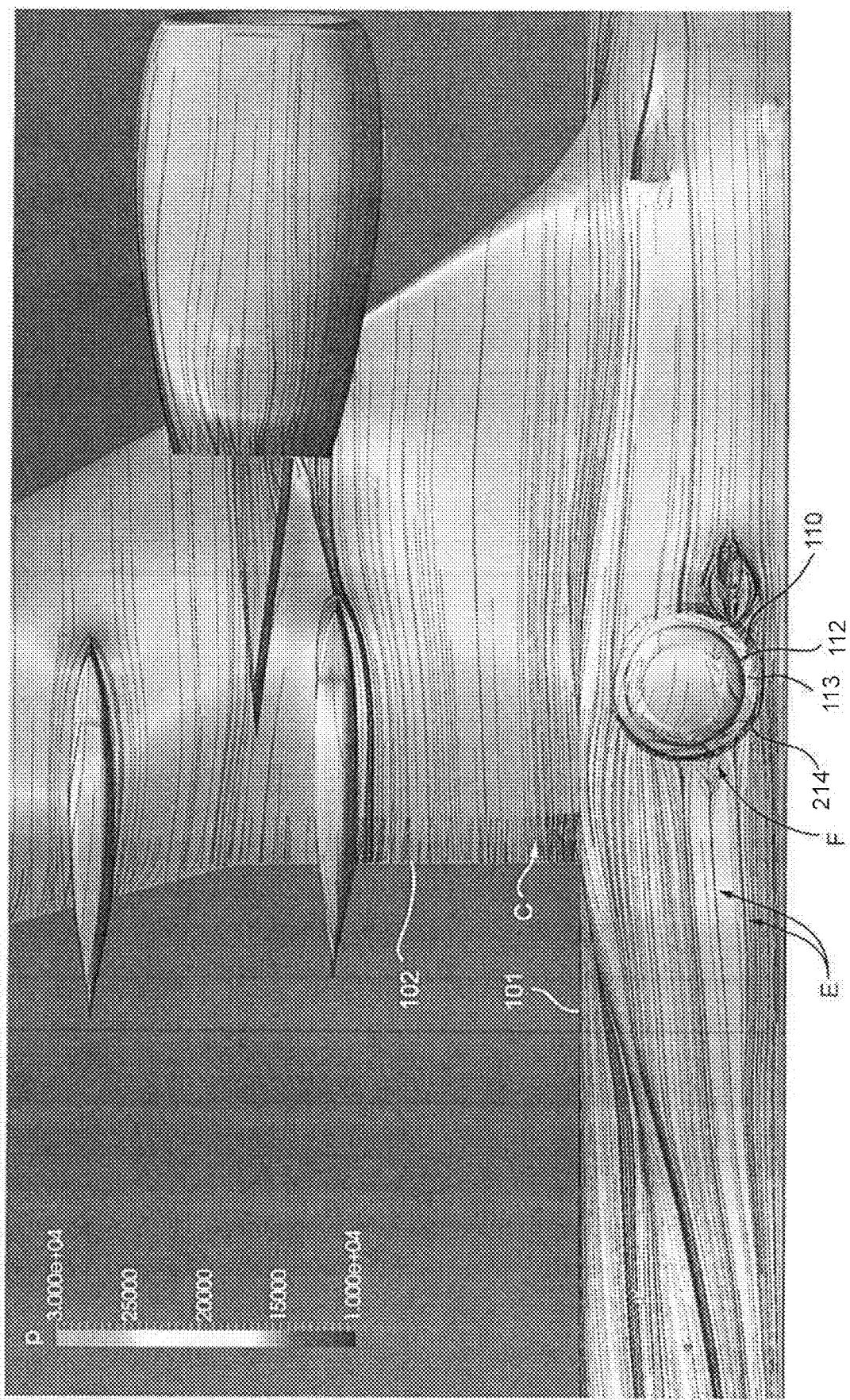
Figure 21A:
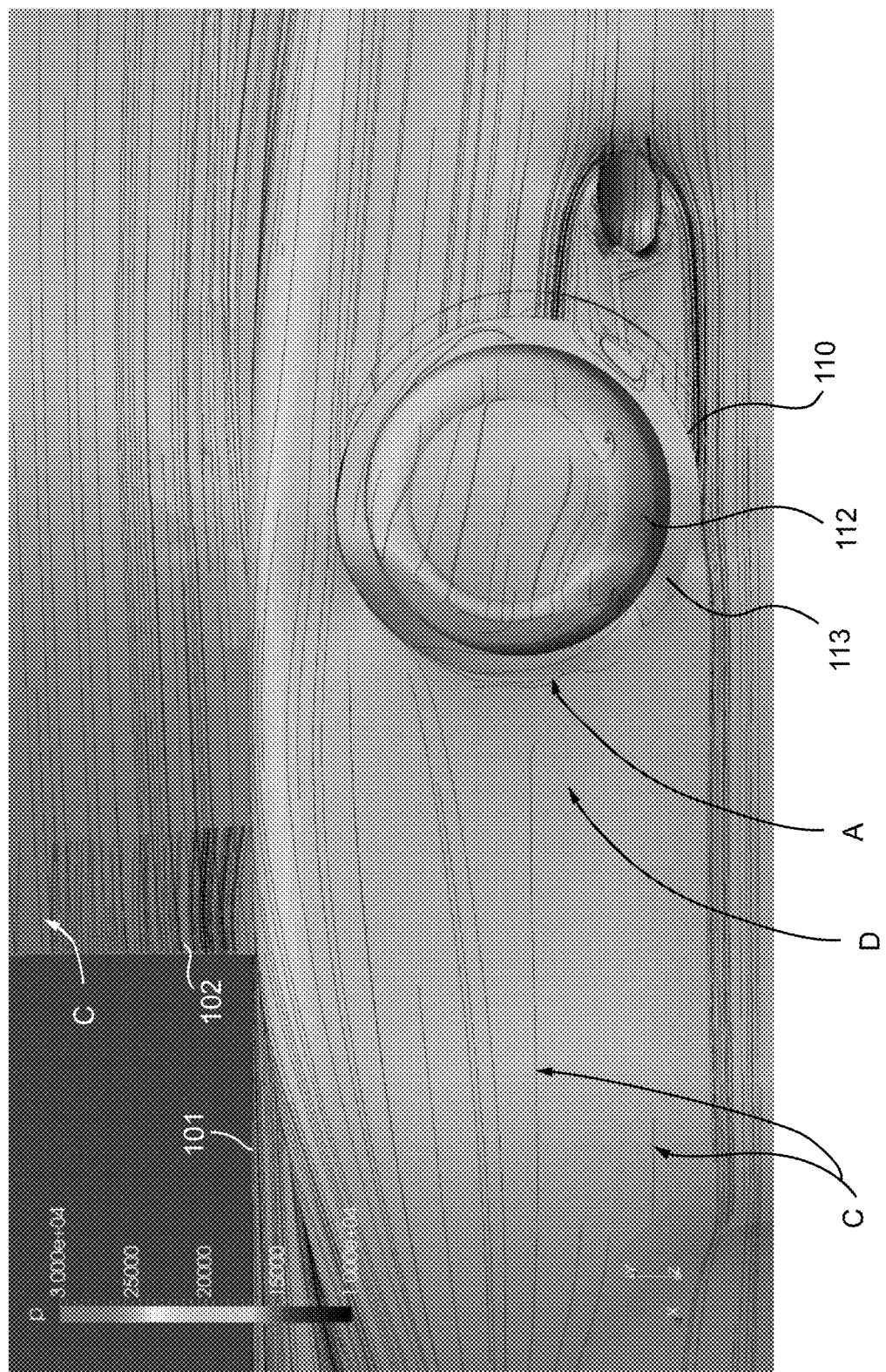
FIG. 21A (prior art) and FIG. 21B are enlarged graphical images of FIGS. 20A and 20B, respectively, and comparatively displaying computer simulations of high and low velocity surface air flow and turbulence about the open right wheel well of the aircraft with and without the aft wheel well fairing installed thereon.
Figure 21B:
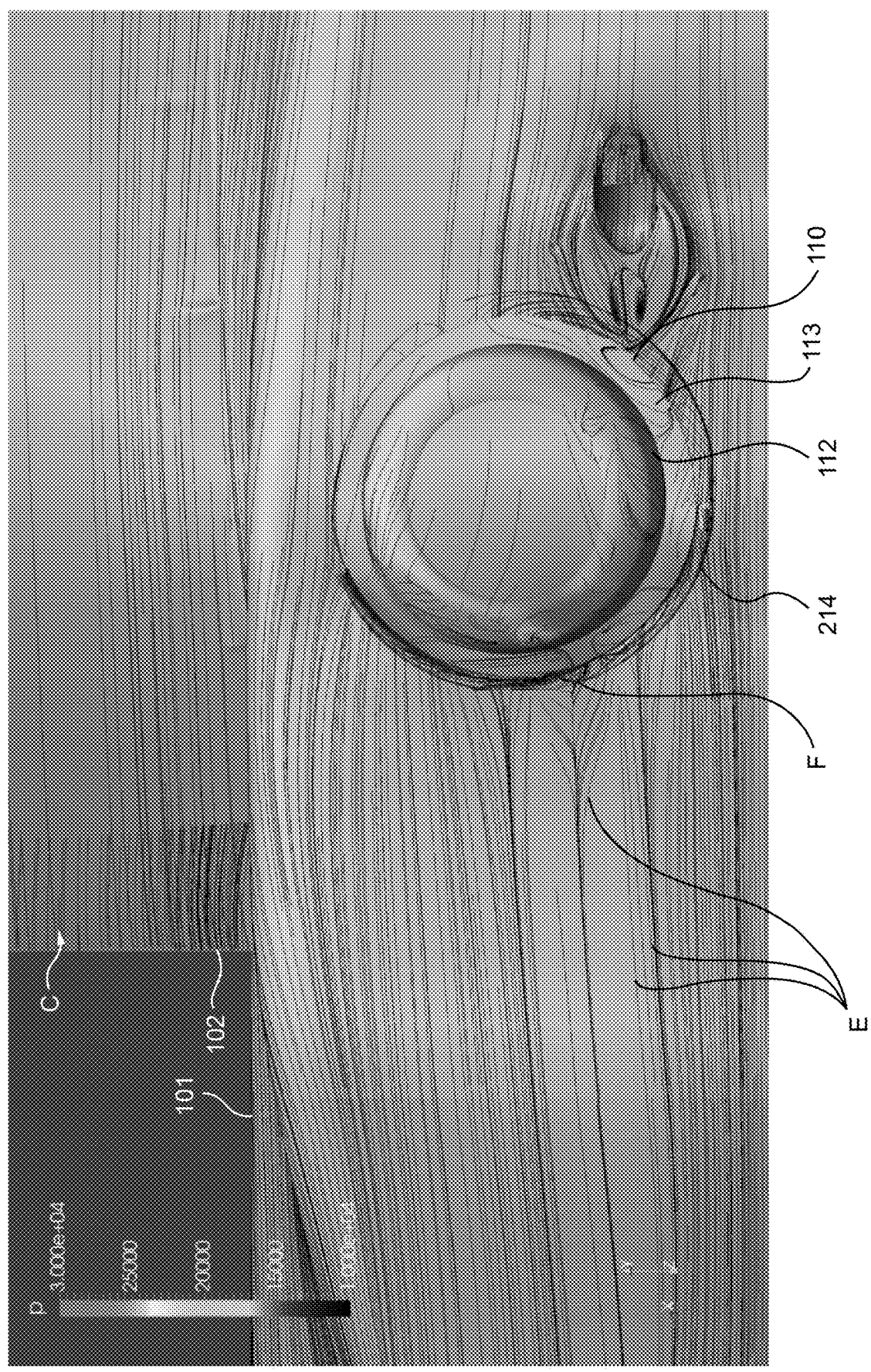

Referring now to FIGS. 20A-21B, representations of various views of screen shots of computer-simulated aircraft to illustrate comparative effects on airflow with and without the wheel well fairing 214 of the present invention mounted on the right side wheel well 110 of the aircraft 100 are illustratively shown. The forward flight axis of the aircraft 100 is towards the right in the figures. FIGS. 20A and 21A are right side prior art views of an unmodified airframe 100 without the wheel well fairing 214 of the present invention. FIGS. 20B and 21B are right side views of the same airframe 100 being modified with the wheel well fairing 214 mounted on an aft portion of the wheel well 110 of the aircraft. The drawings were taken from color-coded computer simulations which were configured and performed by the inventors using computational fluid dynamics (CFD) validated on the well-known NASA "Common Resource Model" (CRM) from the 5th AIAA Drag Prediction Workshop, although such simulation program is not considered limiting. The simulations conducted were from an industry standard model of a 767/777/A330/A350 class aircraft. The CRM is used throughout the industry in wind tunnel and CFD work to develop an understanding of drag and how to predict it. High surface pressure areas are illustrated by darker shading, as compared to low surface pressure areas which are illustrated by lighter shading at specific areas of the aircraft.

Referring now to FIGS. 20A and 21A, the CFD plot illustratively depicts a BOEING 737 having an open wheel well 110 and shows separation of flow on the fuselage aft of the wheel well 110. In the figures, the substantially horizontally directed lines depicted over the wing 102, wheel well 110 and fuselage 101 of the aircraft 101, as shown by arrow "C", represent air streamlines along the outer hull surface of the aircraft 100. As seen in the figures, the air flow illustrated by the streamlines C forward of the wheel well 110 are substantially horizontal and, at the forward edge of the wheel well 110, the ejected air turns sharply upwardly into the wheel well 110. The turbulent air flow within the wheel well exits proximate the aft portion of the open wheel well 110 at a high velocity, as shown by arrow "A" in FIGS. 20A and 21A, as well as in FIG. 1. The airflow exits the aft portion of the wheel well 110 substantially normal to the fuselage 101 and forms a vertically and downwardly directed wall of air before subsequently turning rearwardly a distance from the outer surface of the hull.

Referring again to FIGS. 20A and 21A, the absence of the streamlines C immediately aft of the wheel well 110, as shown by arrow "D", illustrates that the airflow out of the aft portion of the wheel well 110 at arrow A forms an air blockade against the surface air flow along the exterior surface of the fuselage, and undesirably results in air separation, drag and noise occurring aft of the wheel wells 110. By way of comparison, referring to FIGS. 20B and 21B, the surface flow streamlines C indicated by arrow "E" are present aft of the wheel well 110 because the wheel well Coanda fairing 214 of the present invention turns the air expelled out of aft portion of the open wheel well 110 approximately ninety degrees along the exterior surface of the Coanda fairing 214, and therefore much closer to the outer hull surface of the adjacent fuselage 101, as also illustrated by arrow B in FIG. 5. More specifically, the CFD plots of the same open wheel well 110 with the Coanda fairing 214 installed illustrates significantly more closer and organized air flow along the exterior surface of the fuselage 101 aft of the wheel well 110. This is evidenced by the straighter and more continuous streamlines E aft of the wheel well 110, as compared to the CFD plots of FIGS. 20A and 21A. Accordingly, the wheel well fairing 214 of the present invention changes the air flow out of aft portion of the wheel well from a high pressure and low velocity flow rate (arrow D in FIGS. 20A and 21A), to a low pressure and high velocity flow rate, as indicated by arrow "F" in FIGS. 20B and 21B. In addition, the low pressure/high velocity environment induced by the wheel well fairing 214 can advantageously provide additional thrust in the forward direction coming out of the wheel well 110, as opposed to the drag that is normally induced by the prior art fairings 114 installed in the open wheel wells 110 of current aircraft.

Although various embodiments of the wheel well fairing 214 have been shown and described herein for mounting on the BOEING 737 model airframes (e.g., 737 NG-700 and the 737 MAX-7 airframes), such fairing and airframe are described for illustrative purposes only, as a person of ordinary skill in the art will appreciate that the wheel well fairing 214 of the present invention can be provided for any other aircraft having an open wheel well 110 configuration.

Advantageously, the present trailing wheel well fairing 214 can be implemented after the fuselage designs have been frozen or are already in production. For a newly designed aircraft, the fairing 214 can be iterative and be optimized with regard to the other components. A person of ordinary skill in the art will appreciate that other embodiments of the wheel well fairing assembly 214 can be formed and positioned in a similar manner described above for various aircraft models and at different locations on the fuselage.

While the foregoing is directed to embodiments of the present invention, other and further embodiments and advantages of the invention can be envisioned by those of ordinary skill in the art based on this description without departing from the basic scope of the invention, which is to be determined by the claims that follow.

What is claimed is:

1. A wheel well fairing for reducing drag on an aircraft having a fuselage configured with an open wheel well for stowing landing gear of the aircraft, the wheel well fairing comprising a Coanda fairing having a convex-shaped lower portion and an upper portion, the upper portion being configured for positioning adjacent an interior vertically-orientated sidewall of the wheel well, the convex-shaped lower portion having a bottom surface configured to align and extend evenly with an adjacent outer hull surface of the fuselage.

2. The wheel well fairing of claim 1, wherein the convex-shaped lower portion is curved radially inwardly within the wheel well between the upper portion and bottom surface.

3. The wheel well fairing of claim 1, wherein the convex-shaped lower portion extends about an aft portion of the wheel well.

4. The wheel well fairing of claim 3, wherein the convex-shaped lower portion circumscribes at least ninety degrees along the aft portion of the wheel well.

5. The wheel well fairing of claim 3, wherein the convex-shaped lower portion circumscribes one-hundred and eighty degrees along the aft portion of the wheel well.

6. The wheel well fairing of claim 1, wherein the bottom surface of the convex-shaped lower portion is configured with matching angles and contours as outer hull surface of the fuselage.

7. The wheel well fairing of claim 1, wherein the upper portion has a concave-shaped curvature and extends from the convex-shaped lower portion, and wherein the concave-shaped upper portion is configured for positioning adjacent the interior vertically-orientated sidewall of the wheel well.

8. The wheel well fairing of claim 7, wherein the concave-shaped upper portion has a radius less than a radius of the convex-shaped lower portion.

9. The wheel well fairing of claim 1, wherein the upper portion is linear-shaped and extends from the convex-shaped lower portion, wherein the linear-shaped upper portion is configured for positioning adjacent the interior vertically orientated sidewall of the wheel well.

10. The wheel well fairing of claim 1, further comprising an angle bracket configured for mounting the wheel well fairing to the interior vertically-orientated sidewall of the wheel well.

11. The wheel well fairing of claim 10, wherein the angle bracket is L-shaped.

12. The wheel well fairing of claim 10, wherein the bottom surface of the convex-shaped lower portion is attached to a horizontal leg of the angle bracket.

13. The wheel well fairing of claim 12, wherein the bottom surface of the convex-shaped lower portion is attached to a horizontal leg of the angle bracket via at least one fastener and includes one of a counter-bore and countersink configured to receive a head portion of one of the at least one fasteners.

14. The wheel well fairing of claim 10, wherein a vertical leg of the angle bracket is configured for attachment to the interior vertically-orientated sidewall of the wheel well.

15. The wheel well fairing of claim 10, wherein the bottom surface of the convex-shaped lower portion is attached to a horizontal leg of the angle bracket after the angle bracket is installed in the wheel well.

16. The wheel well fairing, of claim 1, wherein the upper portion is configured for mounting the wheel well fairing to the interior vertically-orientated sidewall of the wheel well.

17. The wheel well fairing of claim 1, wherein the bottom portion of the convex-shaped lower portion of the Coanda fairing forms a portion of an outer exterior surface of the Coanda fairing, said outer exterior surface being configured to reduce drag and noise from the aircraft by reducing airflow separation aft of a wing-to-fuselage junction.

18. The wheel well fairing of claim 1 which is configured for installation in the open wheel well of a commercial aircraft to reduce drag and noise by reducing airflow separation aft of a wing-to-fuselage junction.

19. The wheel well fairing of claim 1, in which an exterior surface of the Coanda fairing is configured to expel air out of the aft portion of the wheel well at a low pressure and high velocity and flows in a direction rearward along the outer hull surface of the fuselage.

20. The wheel well fairing of claim 1, wherein the upper portion is configured to direct air flow downwardly out of the wheel well, and the convex-shaped lower portion is configured to turn the air flow in proximity to and along the outer hull surface of the fuselage.

21. The wheel well fairing of claim 1, wherein the bottom surface extends parallel to the adjacent outer hull surface of the fuselage.

22. The wheel well fairing of claim 1, wherein the bottom surface of the Coanda fairing is planar in shape to conform to the adjacent outer hull surface of the fuselage.

23. The wheel well fairing of claim 1 further including cutouts that are sized and dimensioned to accommodate non-fairing objects mounted in the open wheel well of the aircraft.

24. The wheel well fairing of claim 1, wherein the Coanda fairing is formed by a plurality of concatenated segments mounted along the vertically-orientated sidewall of the wheel well.

25. The wheel well fairing of claim 1, wherein the Coanda fairing is incorporated into the wheel well as part of a new aircraft design.

26. The wheel well fairing of claim 1, wherein the Coanda fairing is formed as a kit for installation in the wheel well of the aircraft.

27. A wheel well fairing for reducing drag on an aircraft having a fuselage configured with an open wheel well for stowing landing gear of the aircraft, the wheel well fairing comprising a Coanda fairing having a convex-shaped lower portion and an upper portion, the upper portion being configured for positioning adjacent an interior vertically-orientated sidewall of the wheel well, the convex-shaped lower portion having a bottom surface configured to extend parallel to and positioned adjacent to an outer hull surface of the fuselage.

* * * * *